US007158119B2

(12) United States Patent
Yokoji et al.

(10) Patent No.: US 7,158,119 B2
(45) Date of Patent: Jan. 2, 2007

(54) TRACK BALL DEVICE AND ELECTRONIC APPARATUS USING THE SAME

(75) Inventors: Shigeru Yokoji, Moriguchi (JP); Tamotsu Yamamoto, Ashiya (JP); Masaki Nakase, Obama (JP); Toyoshi Fukumura, Maizuru (JP)

(73) Assignee: Matsushita Electric Industrial Co., Ltd. (JP)

( * ) Notice: Subject to any disclaimer, the term of this patent is extended or adjusted under 35 U.S.C. 154(b) by 129 days.

(21) Appl. No.: 11/057,520

(22) Filed: Feb. 15, 2005

(65) Prior Publication Data

US 2005/0156893 A1    Jul. 21, 2005

Related U.S. Application Data

(62) Division of application No. 09/958,132, filed as application No. PCT/JP01/00821 on Feb. 6, 2001, now Pat. No. 6,909,422.

(30) Foreign Application Priority Data

| Feb. 7, 2000 | (JP) | ............................. 2000-028668 |
| Mar. 10, 2000 | (JP) | ............................. 2000-066502 |
| Mar. 17, 2000 | (JP) | ............................. 2000-076202 |

(51) Int. Cl.
     *G09G 5/08*    (2006.01)
(52) U.S. Cl. ...................... 345/167; 345/156; 345/157; 345/163; 345/164
(58) Field of Classification Search ................ 345/156, 345/157, 158, 159, 161, 163, 164, 165, 166, 345/167
See application file for complete search history.

(56) References Cited

U.S. PATENT DOCUMENTS

| 5,428,368 A | * | 6/1995 | Grant | ......................... 345/163 |
| 5,583,541 A | * | 12/1996 | Solhjell | ...................... 345/163 |
| 2002/0118167 A1 | * | 8/2002 | Mei et al. | ................... 345/163 |

FOREIGN PATENT DOCUMENTS

| JP | 59-94133 | 5/1984 |
| JP | 4-93329 | 8/1992 |
| JP | 5-55227 | 7/1993 |
| JP | 05-233146 | 9/1993 |
| JP | 5-83887 | 11/1993 |
| JP | 6-83530 | 3/1994 |
| JP | 6-102996 | 4/1994 |

(Continued)

*Primary Examiner*—Bipin Shalwala
*Assistant Examiner*—Vincent E. Kovalick
(74) *Attorney, Agent, or Firm*—Steptoe & Johnson LLP

(57) ABSTRACT

Relating to a track ball device for manipulating a cursor moving on a display screen of an electronic apparatus, a track ball device being manipulated precisely while generating a click feel when a ball is rotated, having a small play angle and small size is presented. Beneath the center of the ball, the ball is rotatably supported by four rollers. The section of a contacting portion of the rollers contacting with the ball is a circular sawtooth profile, and the directions of the sawtooth serrations of opposite rollers are reverse to each other. Rollers 2 to 5 have switches as rotation amount detecting units. Further, X roller and Y roller contacting with the outer circumference in the orthogonal direction as seen from above the ball, and third roller hold the ball rotatably. Plural undulations are formed on the outer circumference of large-diameter contacting portions of the X roller and Y roller 3 of circular shaft shape. Rotary encoders are coupled to individual rollers.

46 Claims, 44 Drawing Sheets

FOREIGN PATENT DOCUMENTS

| | | |
|---|---|---|
| JP | 7-98632 | 4/1995 |
| JP | 3012858 | 4/1995 |
| JP | 08-185259 | 7/1996 |
| JP | 9-282088 | 10/1997 |
| JP | 9-319483 | 12/1997 |
| JP | 10-320115 | 12/1998 |
| JP | 11-39090 | 2/1999 |

* cited by examiner

TRACK BALL DEVICE AND ELECTRONIC APPARATUS USING THE SAME

This application is a division of Ser. No. 09/958,132 filed Nov. 21, 2001 now U.S. Pat. No. 6,909,422, which in turn is a national stage entry of International Application No. PCT/JP01/00821 filed Feb. 6, 2001 designating the U.S., which claims the benefit of Japanese Application Nos. 2000-028668 filed Feb. 7, 2000, 2000-066502 filed Mar. 10, 2000, and 2000-076202 filed Mar. 17, 2000.

TECHNICAL FIELD

The present invention relates to a track ball device for manipulating a cursor moving on a display screen of an electronic apparatus, and an electronic apparatus using the device.

BACKGROUND ART

FIG. 50 is a perspective view showing a configuration of a conventional track ball device. A ball 151, an operating element, is held in a main body (not shown) so as to be rotated freely in all directions when having a surface touched by a hand or finger of an operator. On the outer circumference of the ball, rollers 152 and 153 contacts in orthogonal directions from a top view. Rotary encoders 154 and 155 of two-signal type capable of distinguishing the direction of the rotation are coupled to the rollers 152 and 153 as means for detecting the direction and amount of rotation.

When the ball 151 is rotated by the hand or finger, the rollers 152 and 153 rotate, and the rotary encoders 154 and 155 detect the direction and amount of rotation in an X-axis direction and Y-axis direction of the ball 151, and issue signals corresponding to them. A circuit of an electronic apparatus employing this track ball device processes the signals and have a cursor (not shown) on a display screen move in an X-axis direction and Y-axis direction according to the detected direction and amount of rotation.

Recently, as the display screen is having a higher resolution, an electronic apparatus having the display screen increases, and is diversified, and the track ball device has used in a small and portable information terminal. In such electronic apparatuses including the conventional track ball devices, since the ball 151 rotates too freely, the cursor often moves ahead of a desired position or is not held stably at the desired position, and the ball is hardly manipulated finely. Therefore, the track ball device capable of manipulating finely at high precision is demanded. And the track ball device having a switch for issuing a signal indicating that a position of the cursor on the display screen is recognized.

As one of the examples to meet such demand, the track ball device disclosed in Japanese Laid-open Patent No. 8-185259 is known. This track ball device, as shown in FIG. 51, has rotary blades 164, 165 and stoppers 166, 167 mounted on rollers 162, 163, give a click feel to an operator manipulating the ball 161.

This track ball device, for generating the click feel, has a rotary torque of the rollers 162, 163 increase because of a hooking engagement of the rotary blades 164, 165 and the stoppers 166, 167. A larger rotary torque is accordingly transmitted to an area where the ball 161 and the rollers 162 contacts, 163, i.e., a portion for transmitting a rotation of the ball 161 to the rollers 162, 163. As a result, the ball is likely to slip on the friction surface of this contacting area, and a clear click feel may not be generated.

Besides, due to a clearance between the rotary blades 164, 165 and the stoppers 166, 167, the ball 161 has a large rotary play angle between the rollers 162 and 163, and jerkiness which may be felt during manipulation.

Furthermore, this device, since being composed of many constituent members, has a size reduced hardly and has a cost lowered hardly.

SUMMARY OF THE INVENTION

A track ball device is presented, which is capable of generating a click feel when the device has a ball rotated, and of manipulating a cursor moving on a display screen of an electronic apparatus precisely. The track ball device has the ball and rollers slip hardly at a contacting area, generates a clear click feel, and has a small rotary play angle of the rollers and ball. A track ball device of a low profile is further presented, which has a switch for generating a signal indicating that a position of the cursor on the display screen is recognized.

The track ball device includes plural rollers supporting the ball rotatably beneath a central position of the ball. Ratchet gears on confronting rollers are provided. A rotating-direction-regulating unit composed of an arresting ratchet contacting with a teeth of the ratchet gears is provided for arresting the rotation of the rollers in reverse direction in contact with the. Sawtooth serrations inclining obliquely in reverse directions on the confronting rollers are formed at equiangular positions on the circular outer circumference of the ratchet gears.

The section of the portion of the rollers contacting and supporting the ball is a circular sawtooth profile, and the directions of sawtooth serrations of the confronting rollers are reverse to each other. Each roller is provided with a rotation-amount-detecting unit.

An electronic apparatus having the track ball device supports a base unit of the track ball device rotatably on a circuit board located under the device. A self-returning push switch operating by pushed with the rotating base unit is disposed on the circuit board. The ball, upon being pushed down, rotates the base unit rotates downward and manipulates the push switch. Therefore, a track ball device with the push switch having a small projection area and stable operation is obtained.

DESCRIPTION OF THE PREFERRED EMBODIMENTS

Embodiment 1

Figure 1:
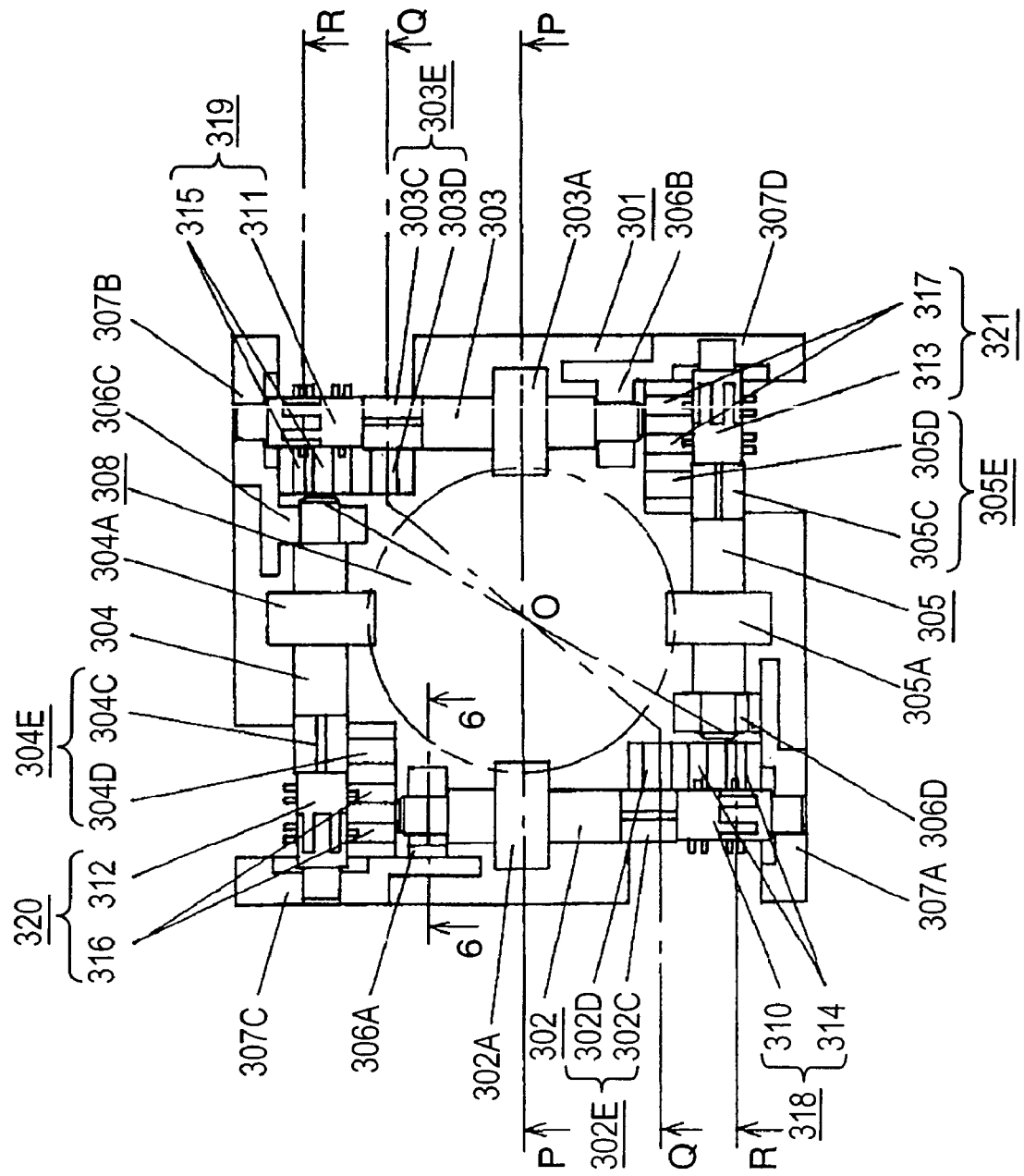
FIG. 1 is a plan of a track ball device having a case excluded according to embodiment 1 of the present invention.
Figure 2:
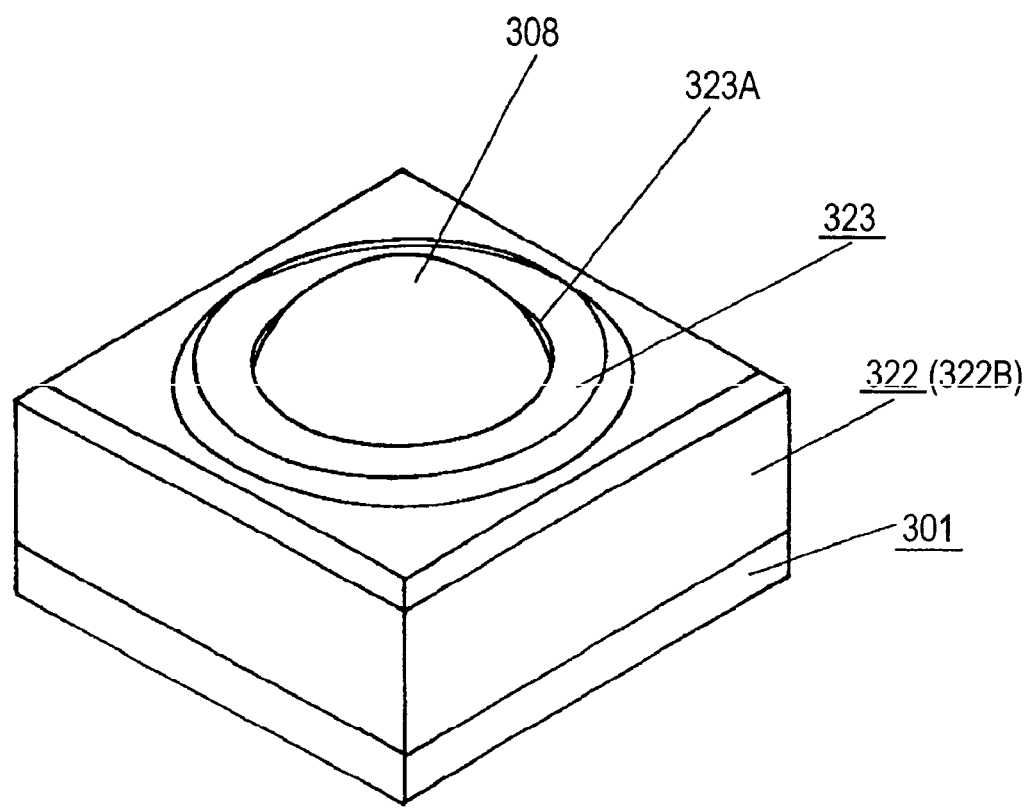
FIG. 2 is a perspective outline view of the track ball device according to embodiment 1.
Figure 3:
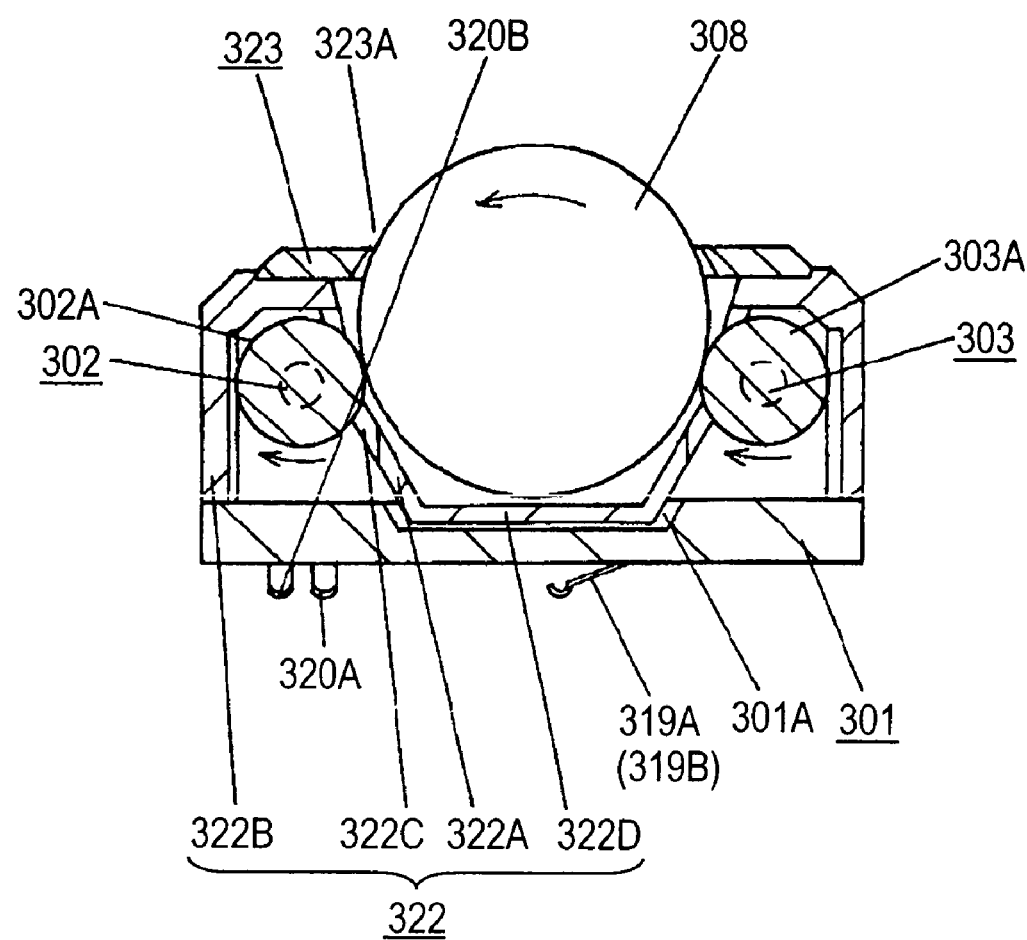
FIG. 3 is a sectional view at a line P-O-P in FIG. 1 of the track ball device including the case according to embodiment 1.
Figure 4:
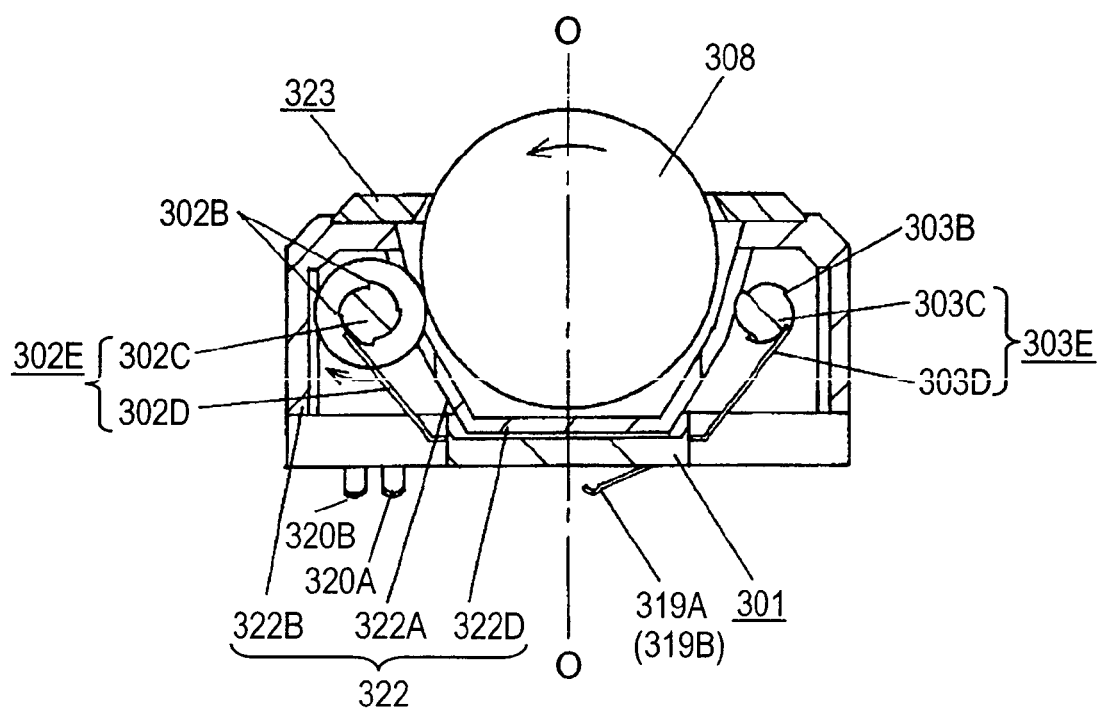
FIG. 4 is a sectional view at a line Q-O-Q in FIG. 1 of the track ball device including the case according to embodiment 1.
Figure 5:
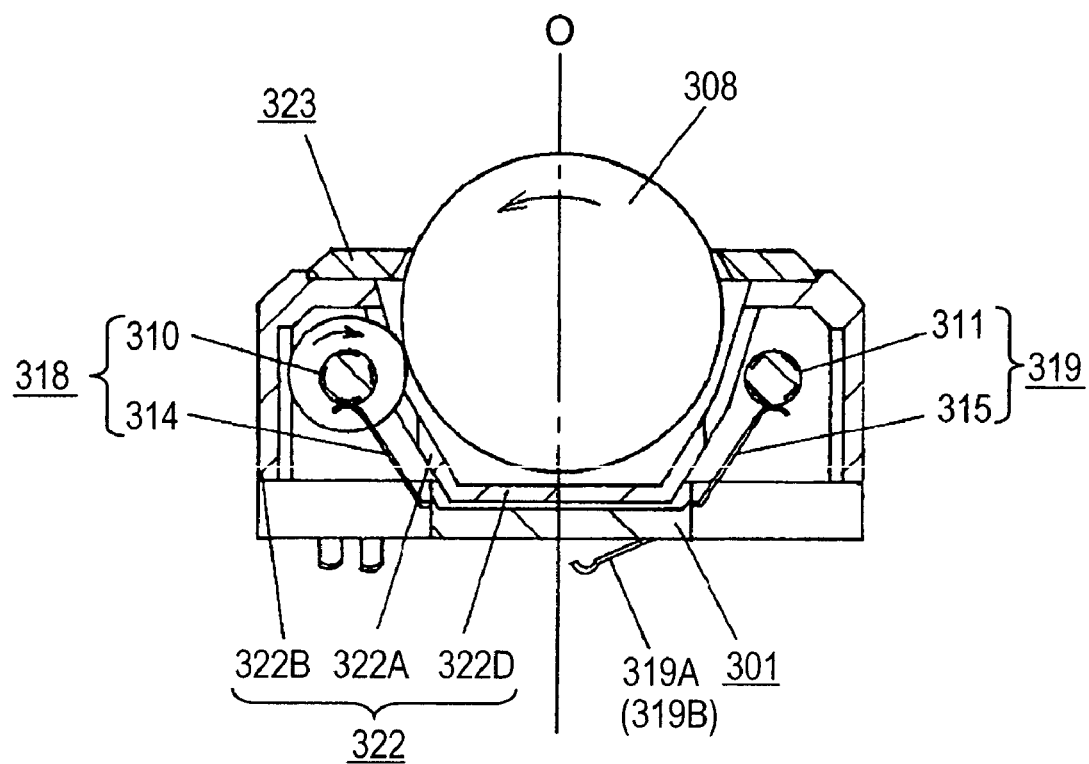
FIG. 5 is a sectional view at a line R-O-R in FIG. 1 of the track ball device including the case according to embodiment 1.

FIG. 1 is a plan view of a track ball device having a case excluded according to embodiment 1 of the present invention, and FIG. 2 is a perspective outline view of the device. FIG. 3 to FIG. 5 are sectional views at cut lines in FIG. 1 of the track ball device having the case, and specifically FIG. 3 is a sectional view at a line P-O-P, FIG. 4 is a sectional view at a line Q-O-Q, and FIG. 5 is a sectional view at a line R-O-R.

A base unit 301 of the track ball device is made of resin in a square shape as seen from the top. Near each side of the top of the base unit 301, as shown in FIG. 1 and FIG. 3, four circular shaft, an XI roller 302, XII roller 303, YI roller 304, and YII roller 305 are disposed as two groups of two opposing rollers are disposed in orthogonal to each other. On the base unit 301, support units 306A to 306D, and support units 307A to 307D are formed unitarily with the base unit at the same height while two of the units are formed for one of the rollers. The rollers are rotatably supported by the support units.

At a position slightly lower than the center of a ball 308, contacting portions 302A, 303A, 304A, and 305A each having a circular section provided in the middle of the rollers 302 to 305 contact with the outer circumference of the ball, respectively. The contacting portions support the ball 308 rotatably in all directions on the same plane.

Figure 6:
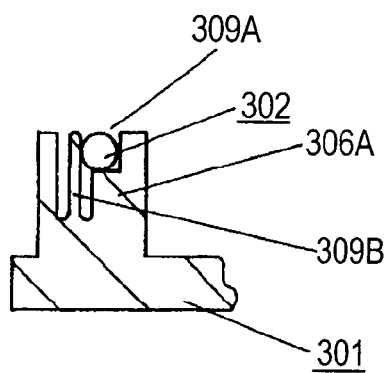
FIG. 6 is a sectional view at a line 6—6 in FIG. 1 of the track ball device according to embodiment 1.

FIG. 6 is a sectional view at a line 6—6 in FIG. 1. As shown in FIG. 6, an elastic leg 309B is disposed in a support recess 309A of the support unit 306A for supporting the XI roller 302. The elastic leg 309B pushes the XI roller 302 and XII roller 303 with a light force in a direction so as to have an opposing interval of the XI roller 302 and XII roller 303 be narrower than a specified interval.

The pressure of elastic leg 309B pushing the XI roller 302 is small. Thus, when the own weight of the ball 308 pushing the XI roller 302 and a pressure for rotating the ball 308 widens the interval against the XII roller 303. As a result, the ball 308 contacts securely with four rollers including the YI roller 304 and YII roller 305 crossing in orthogonal to the rollers 302, 301.

Therefore, the ball 308 contacts securely with four rollers even if the interval and height of the two groups of the parallel rollers, XI roller 302, XII roller 303, YI roller 304, and YII roller 305 are not uniform. According to a requirement, elastic legs similar to the elastic leg 309B of the support unit 306A may be provided in other support units 306B to 306D.

At sides of the contacting portions 302A to 305A of the rollers 302 to 305, as shown in FIG. 1 and FIG. 4, ratchet gears 302C to 305C having sawtooth serrations 302B to 305B are disposed at four positions at 90-degree intervals on the circumference, respectively. The serrations 304B, 305B, and ratchet gears 304C, 305C are not shown. Arresting ratchets 302D to 305D made of a thin elastic metal extending from the base unit 301 elastically contact with the serrations 302B to 305B, respectively. The directions of the sawtooth serrations 302B to 305B are opposite between the confronting XI roller 302 and XII roller 303, and are also opposite between the confronting YI roller 304 and YII roller 305. The gears and arresting ratchets form rotating-direction-regulating portions 302E to 305E for allowing the confronting rollers to rotate only in the mutually opposite directions, respectively.

That is, as shown in FIG. 4, the ball 308, upon being rotated, has the arresting ratchet 302D elastically contacting with the sawtooth serration 302B of the ratchet gear 302C climb up along a slope on the serration 302B. At the XI roller 302 having the gear 302C, the arresting ratchet 302D, upon falling at a step difference between the leading end and root of the serration 302B, generates a clear click feel. The ball 308, upon being rotated, has the arresting ratchet 303D have to run over the step difference between the root of the serration 303B of the gear 303C and the leading end of the adjacent serration. The XII roller 303 having the gear 303C is regulated for not rotating by the arresting ratchet 303D, which cannot run over the step difference.

Furthermore, arresting ratchets 302D to 305D elastically contact with the ratchet gears 302C to 305C of the rollers 302 to 305, respectively, and therefore, the ratchets prevent a jerky motion generated by the ball 308 moving with a slight force.

At sides of the rotating-direction-regulating units 302E to 305E of the rollers 302 to 305, as shown in FIG. 1 and FIG. 5, rotary movable contacts 310 to 313 are disposed, respectively. Elastic fixed contacts 314 to 317 made of thin elastic metal plates extending in pair from the base unit 301 elastically contact with the movable contacts 310 to 313, thus forming rotary switches 318 to 321, which are rotation-amount-detecting units of the rollers.

Figure 7:
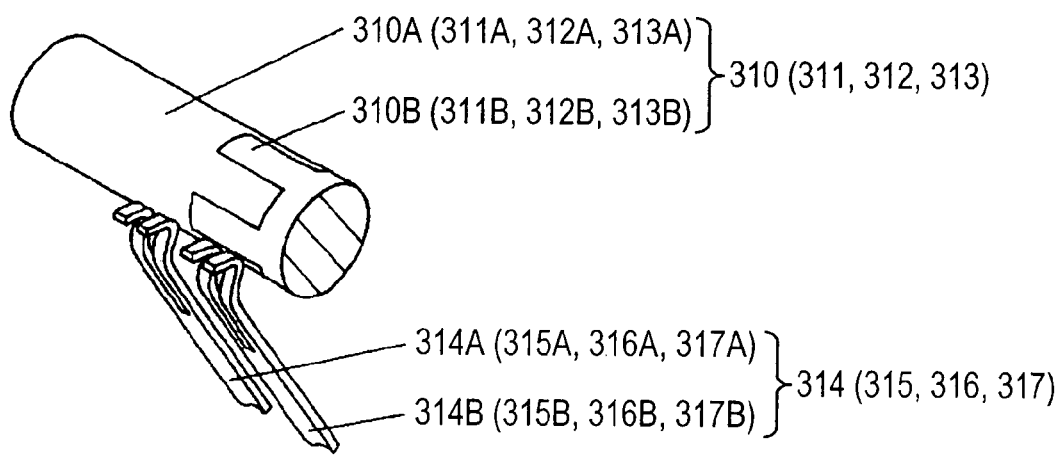
FIG. 7 is a perspective outline view of a rotary switch contact of the track ball device according to embodiment 1.

FIG. 7 is a perspective outline view of the contact of the rotary switch. The elastic fixed contacts 314 to 317 elastically contact with circular rings 310A to 313A of the rotary movable contacts 310 to 313 and comb serrations 310B to 313B conducting to the movable contacts. The elastic fixed contact 314 has contact points 314A and 314B. Similarly, the contacts 315 to 317 have two contact points each 315A to 317B. The rollers 302 to 305, upon rotating, electrically open and close each pair of elastic fixed contacts (314A, 314B) to (317A, 317B), which generate signals.

The comb serrations 310B to 313B of the rotary movable contacts 310 to 313 are provided in four, i.e., the same number as the sawtooth serrations 302B to 305B of the ratchet gears 302C to 305C. The serrations 310B to 313B are disposed at a specified angle to the serrations 302B to 305B, respectively, to generate a signal synchronized with a click feel.

Output terminals 319A, 319B, 320A, 320B of the rotary switches 319, 320 are formed of a thin elastic metal plates unitarily with elastic fixed contacts 316A, 316B, 317A, 317B, respectively, and project to the lower side of the base unit 301. Although not shown, the rotary switches 318, 321 similarly have output terminals 318A, 318B, 321A, and 321B. The track ball device, only upon being pressed and fixed to a circuit board of an electronic apparatus employing the device, has the output terminals elastically connected to the circuit board.

Instead of the contacts 316A to 317B, a flexible connection board (not shown) disposed at the lower side of the base unit 301 may be also connected to the circuit board. As a result, the output terminals 319A to 320B are connected securely. Even if the base unit 301 rotates against the circuit board, the connection board follows the unit, and the connection is maintained.

In FIG. 2 to FIG. 5, a case 322 and a lid plate 323 made of resin cover the track ball device.

The case 322 is, as shown in FIG. 3 to FIG. 5, composed of a bowl unit 322A which is open at the upper end and is disposed to envelope the lower portion of the ball 308, and a peripheral wall 322B which extends downward from the outer circumference of the upper end and fixed to the base unit 301 at the lower end. The bowl unit 322A has four through-holes 322C provided at positions where the central contacting portions 302A to 305A of the rollers 302 to 305 contact with the outer circumference of the ball 308. The center of the bowl unit 322A is a dish 322D, which is accommodated in a dent 301A in the center of the base unit 301. Therefore, even if water splashes over the track ball device, the rotary switches 318 to 321 are not affected from it.

Figure 8:
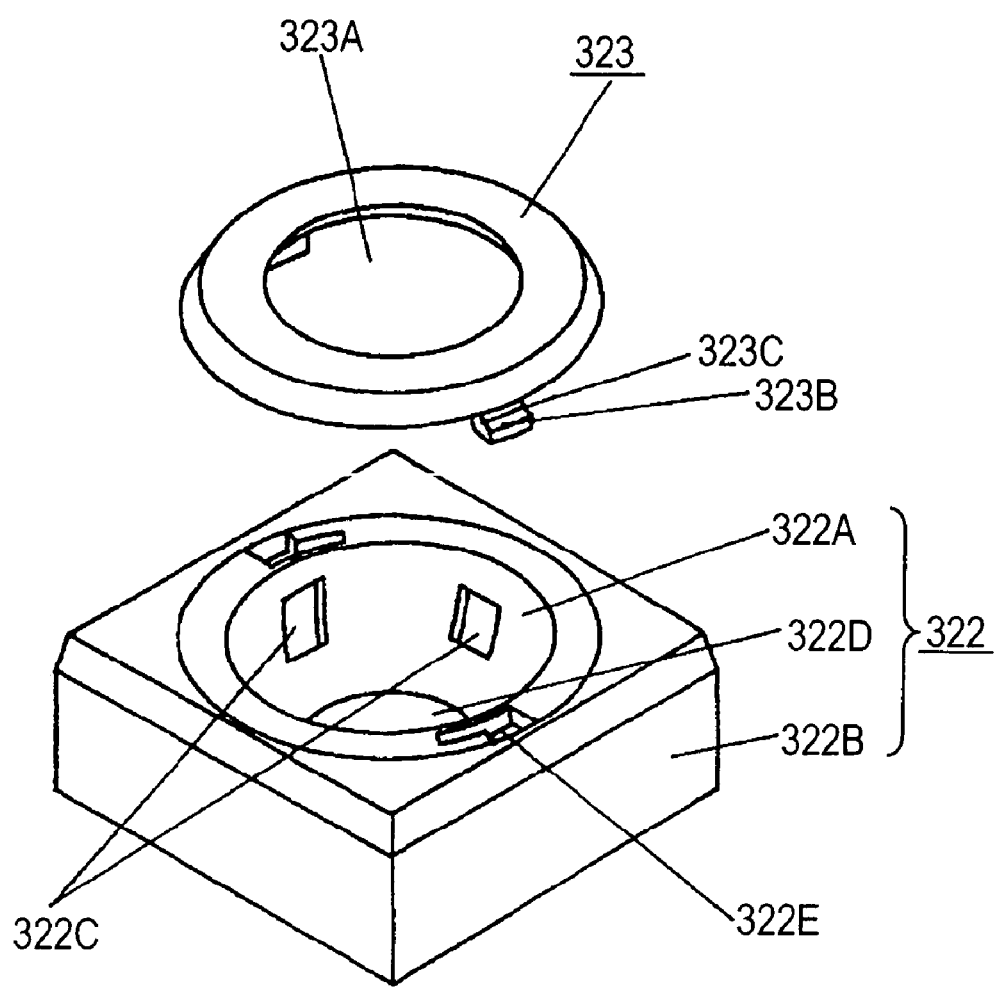
FIG. 8 is a perspective outline view showing a coupling portion of lid plate and case unit of the track ball device in embodiment 1.

FIG. 8 is a perspective outline view showing a portion where the lid plate and case of the track ball device are coupled. The lid plate 322 is, as shown in FIG. 3 to FIG. 5 and FIG. 8, formed like a ring having a circular hole 323A slightly smaller than the diameter of the ball 308. Two legs 323C with steps 323B of at the lower side of the lid plate 323 are respectively inserted into two coupling holes 322E at the upper end of the case unit 322. Further, the lid plate 323, upon being turned, is detachably coupled with the case 322, thereby preventing the ball 308 from being displaced from the track ball device in an ordinary state. The lid plate 323, upon being detached, allows the ball 308 to be replaced.

An operation of the track ball device of the embodiment having such configuration will be explained below.

In the ordinary state, when the ball 308 is rotated in a left direction as indicated by an arrow in FIG. 3 by touching the top of the ball 308, an operating element, projecting upward from the circular hole 323A of the lid plate 323 with a hand or finger, the rotation is not transmitted to the YI roller 304 and YII roller 305 which are in orthogonal to the operating direction, out of the four rollers 302 to 305 contacting with the contacting portions 302A to 305A on the outer circumference of the ball 308. At sides of the contacting portions 302A and 303A of the XI roller 302 and XII roller 303, as shown in FIG. 4, rotating direction regulating unitss 302E, 303E composed of ratchet gears 302C, 303C having sawtooth serrations 302B, 303B, and arresting ratchets 302D, 303D elastically contacting therewith are provided. The ball 308 in the left direction, upon being rotated, makes the arresting ratchet 302D elastically contacting with the serration 302B of the XI roller 302 climb along the slope of the serration 302B. Therefore, the XI roller 302 rotates since the rotary torque transmitted from the ball 308 to the contacting portion 302A gradually increases. As a result, the arresting ratchet 302D falls at a portion having the step difference from the leading end of the serration 302B to the root of the next serration, and at the moment, generates a click feel. Simultaneously, the transmitted rotary torque decreases gradually. Again, the arresting ratchet 302D climbs up along the slope of the next serration, and then, falls at a the portion having the next step difference, and this operation is repeated.

Along with a rotation of the XI roller 302, the rotary movable contact 310 forming the rotary switch 318 of the XI roller 302 also rotates, and the elastic fixed contact 314, that is, contacts 314A, 314B elastically contacting with the circular ring 310A and comb serration 310B are electrically opened or closed. As a result, an electric signal synchronized with the click feel is generated four times in one rotation, and the signal is transmitted to the circuit of the electronic apparatus through the output terminals 318A, 318B, which are not shown.

With this signal, the rotating speed of the XI roller 302, that is, the moving distance of the cursor on the display screen of the electronic apparatus employing the track ball device in the X-axis positive direction or negative direction is detected.

On the other hand, by the rotation of the ball 308 in the left direction, the arresting ratchet 303D elastically contacting with the serration 303B of the rotating direction regulating unit 303E of the XII roller 303 cannot run over the step difference from the root of the serration 303B to the leading end of the adjacent serration, and is stopped at the root of the step difference. Therefore, the XII roller 303 does not rotate, and the ball 308 slips at the contacting portion 303A. Hence, the rotary switch 319 of the XII roller 303 does not operate, and does not generate the electric signal.

Similarly, by a rotation of the ball 308 in the right direction, the XI roller 302 does not rotate, and the XII roller 303 rotates.

By the rotation of the ball 308 in a front-and-back direction, the rotation is not transmitted to the XI roller 302 and XII roller 303, but is transmitted to the YI roller 304 or YII roller 305, and the moving distance in the cursor setting direction, that is, a positive or negative direction of the Y-axis is detected.

By an oblique rotation of the ball 308, either XI roller 302 or XII roller 303, and either YI roller 304 or YII roller 305 rotate depending on the rotating direction and rotating amount of the ball 308. Accordingly, the moving distance in the cursor setting direction in the directions of X-axis and Y-axis is detected.

In this explanation, the ratchet gears 302B to 305B have four sawtooth serrations 302B to 305B at 90-degree intervals, respectively, and corresponding four comb serrations 310B to 313B are provided in the rotary movable contacts 310 to 313, respectively. That is, four signals are generated in one rotation of each one of the rollers 302 to 305, but the number of times can be increased or decreased as required.

Since not being necessary to recognize the direction of rotation of rollers in the rotating amount detecting unit, the track ball device having a simple structure of the rotation amount detecting portion and an easy process of outputting signal is provided.

The ball 308, upon having an entire surface thereof coated with a film made of elastic material, has an increased frictional force between the contacting portions 302A to 305A of the rollers 302 to 305. Therefore, the ball hardly slips in this area, and static electricity is hardly generated, so that an easy-to-manipulate track ball device is obtained.

Further, the ball 108, upon having fine recesses on the entire surface, prevents the hand or finger from slips on the surface at a manipulation, so that an easy-to-manipulate track ball device is obtained.

Embodiment 2

Figure 9:
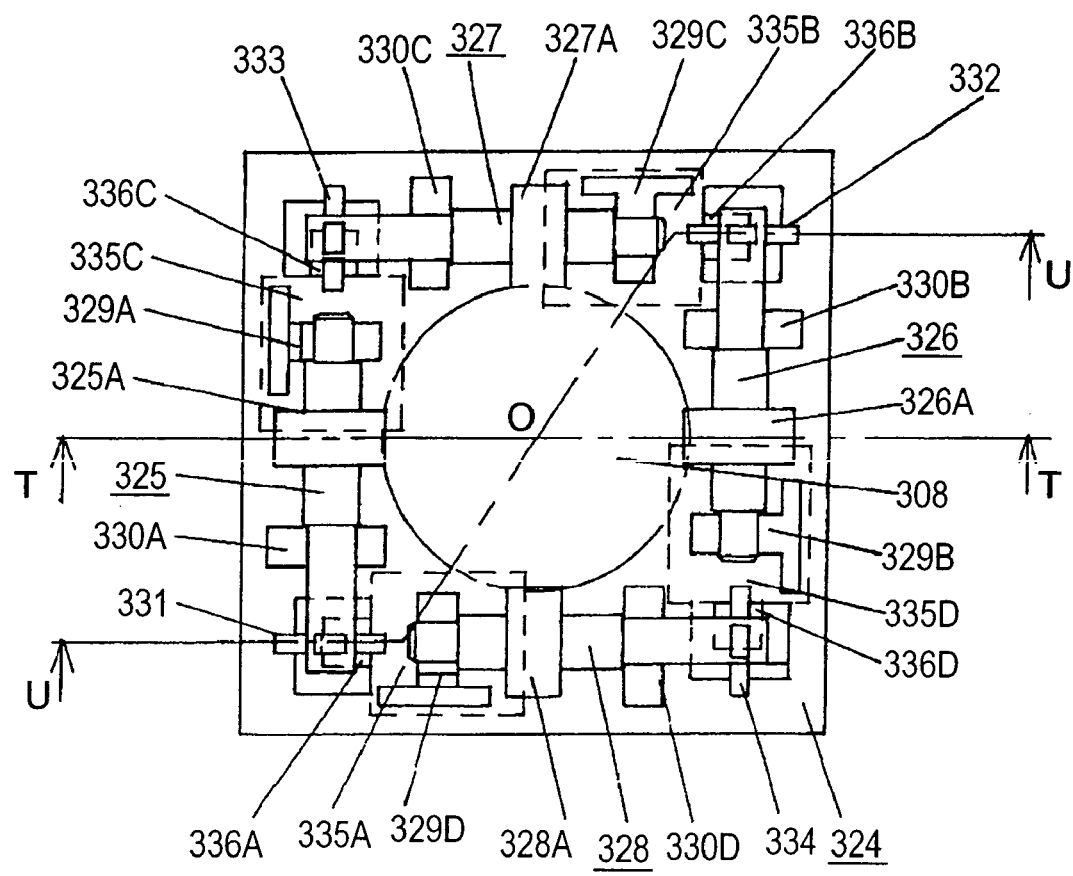
FIG. 9 is a plan of a track ball device having a case excluded according to embodiment 2 of the invention.
Figure 10:
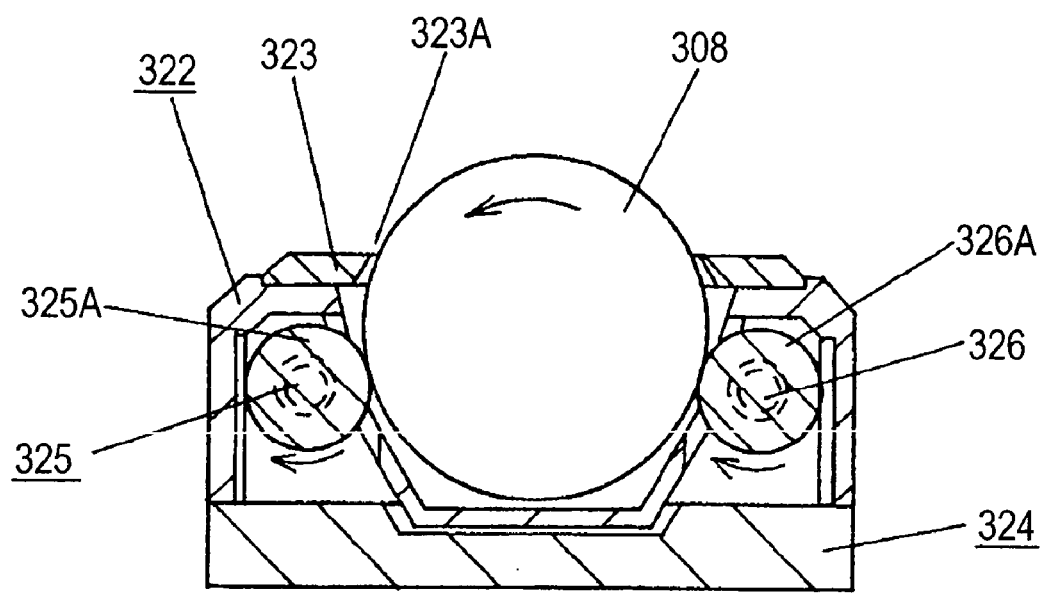
FIG. 10 is a sectional view at a line T-O-T in FIG. 9 of the track ball device including the case according to embodiment 2.
Figure 11:
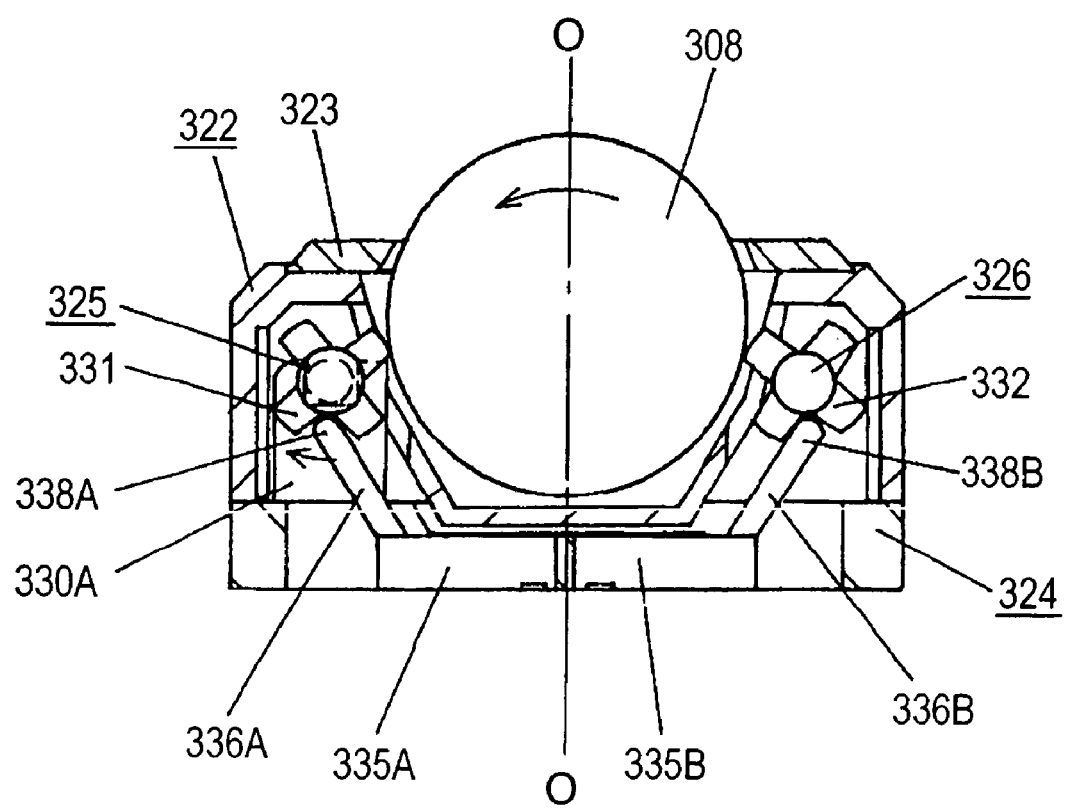
FIG. 11 is a sectional view at a line U-O-U in FIG. 9 of the track ball device including the case according to embodiment 2.

FIG. 9 is a plan of a track ball device having a case excluded according to embodiment 2 of the invention. FIG. 10 and FIG. 11 are sectional views of the track ball device having the case. FIG. 10 is a sectional view at a line T-O-T, and FIG. 11 is a sectional view at a line U-O-U.

Similarly to embodiment 1, a track ball device in this embodiment has four circular shaft XI roller 325, XII roller 326, and YI roller 327, YII roller 328 disposed in two sets of two opposing rollers in orthogonal to each other on the top of a square base unit 324 made of resin. The base unit 324 has support units 329A to 329D, and support units 330A to 330D formed at two positions for one roller unitarily with the base unit at the same height. The rollers are rotatably supported by the support units. At a slightly lower position than the center of a ball 308, an operating element, contacting portions 325A to 328A having circular sections contact on the outer circumference of the ball, and support the ball 308 rotatably in all directions on the same plane.

The track ball device according to the embodiment, four pins 331 to 334 project radially at intervals of 90 degrees to the center of a rotation at one end of the rollers 325 to 328, respectively. The base unit 324 has four switches 335A to 335D having the same structure as rotation amount detecting units. Operation levers 336A to 336D and pins 331 to 334 of the rollers 325 to 328 contact and engage with each other.

The switch is a thin self-resetting switch of push operation type.

Figure 12:
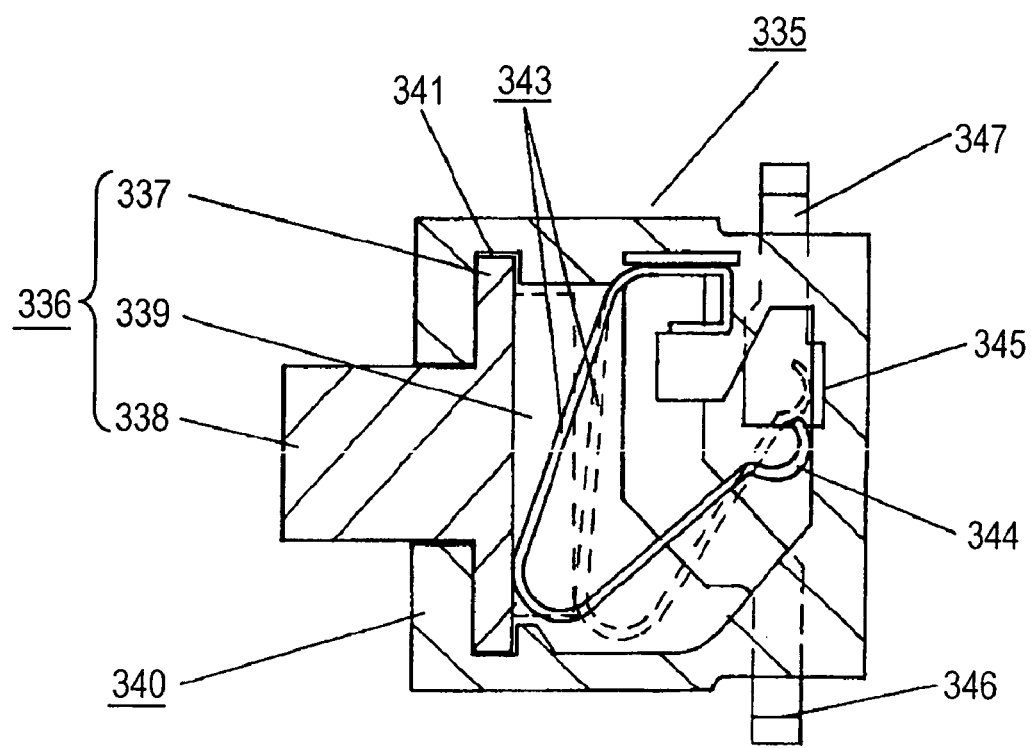
FIG. 12 is a plan view of the track ball device having a cover of a switch excluded according to embodiment 2.
Figure 13:
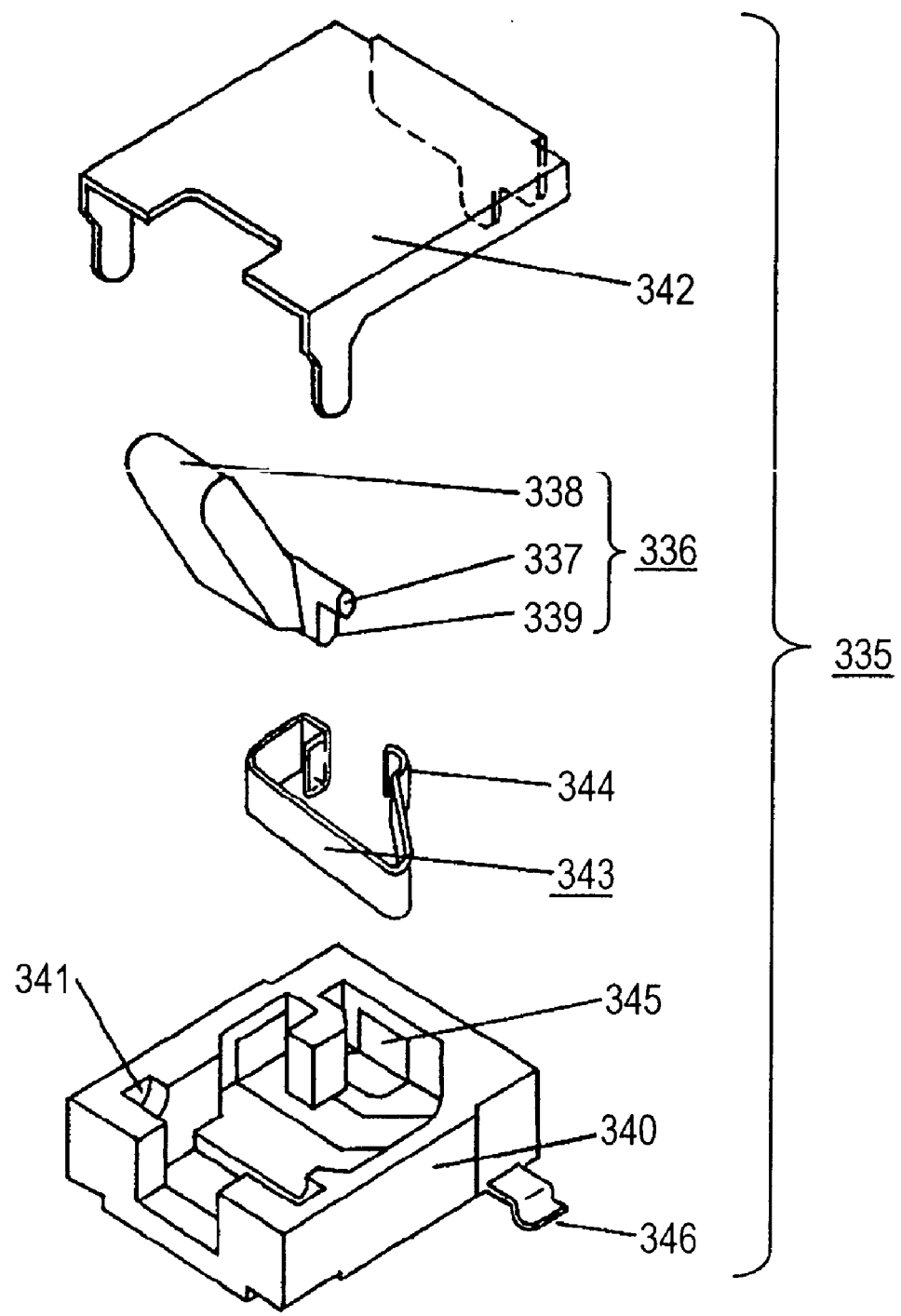
FIG. 13 is a perspective view of a disassembled switch of the track ball device according to embodiment 2.

FIG. 12 is a plan view of the switch having a switch cover excluded, and FIG. 13 is a perspective view of the disassembled switch. Each of switches 335A to 335D, roller rotation amount detecting units, has a shaft 337 of a lever 336 rotatably supported by a support recess 341 and a cover 342 provided at the upper end of a switch case 340. An elastic force of the movable contact 343 presses the leading end 338 of the lever 336 to be located at an upper end position.

The lever 336, upon having the leading end 338 thereof pushed down to a specified position, as indicated by dotted line in FIG. 12, rotates about the shaft 337. A drive portion 339 below the lever 336 pushes and deforms elastically a movable contact 343 made of a thin elastic metal plate into the switch case 340, and then, makes a contact point 344 contact with a fixed contact 345, thereby short-circuiting between output terminals 346 and 347. The lever 336, upon having the pushing force removed, returns to an original state by the elastic restoring force of the movable contact 343.

As shown in FIG. 11, in the switches 335A, 335B, only when the leading ends 338A, 338B of the levers 336A, 336B are pushed in the direction departing from the ball 308 by the four pins 331, 332 projecting radially each at one end of the two mutually confronting XI roller 325 and XII roller 326, the lever 336A or 336B rotates and displaces elastically.

The levers 336A, 336B of the switches 335A, 335B function as arresting ratchets, and form rotating direction regulating units for regulating rotating directions of the rollers 325, 326. That is, the confronting XI roller 325 and XII roller 326, upon rotating in mutually different directions, actuate one of the switch 335A and 335B. Similarly, the YI roller 327 and YII roller 328, upon rotating in mutually different directions, actuate one of the switch 335C and 335D.

The case 322 and lid plate 323 covering the track ball device and other structure are the same as in embodiment 1.

An operation of the track ball device of the embodiment having such configuration will be explained below.

Figure 14:
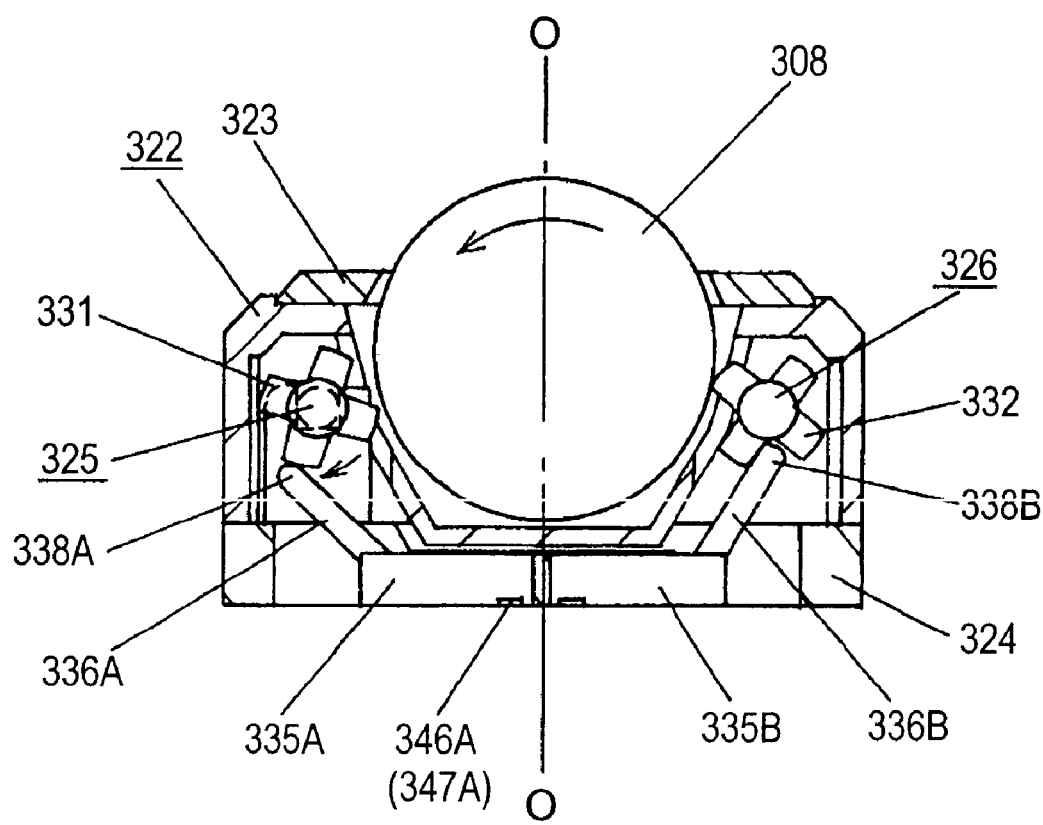
FIG. 14 is a sectional view at a line U-O-U in FIG. 9 of the track ball device having a ball rotated in the case according to embodiment 2.

In an ordinary state, the ball 308, upon being rotated in a left direction as indicated by an arrow in FIG. 10 by touching the top of the ball 308 projecting upward from the circular hole 323A of the lid plate 323 by a hand or finger operates as explained below. The rotation is not transmitted to the YI roller 327 and YII roller 328 which are disposed in orthogonal to the operating direction, out of the four rollers 325 to 328 contacting with the contacting portions 325A to 328A on the outer circumference of the ball 308. At one end of the XI roller 325 and XII roller 326, as shown in FIG. 9 and FIG. 11, four pins 331 and 332 project radially. The pins contact with the levers 336A and 336B of the switches 335A and 335B disposed on the base unit 324, and form the rotating direction regulating units as mentioned above. The ball 308, upon being rotated in the left direction pushes the leading end 338A in a direction departing from the ball 308. As a result, the lever 336A of the switch 335A rotates with resisting the elastic force, and does not regulate the rotation of the XI roller 325. Therefore, as shown in the sectional view in FIG. 14, since the rotary torque transmitted from the ball 308 to the contacting portion 325A increases, the leading end 338A is pushed down. As a result, as explained in FIG. 12, the switch 335A is actuated, and the output terminals 346A, 347A are short-circuited.

When the pin 331 and lever 336A are disengaged, the lever 336A is pushed back to an original upper end position by the elastic restoring force of the movable contact, and abuts against the next pin 331 of the XI roller 325 with a click feel. As a result, the transmitted torque is slightly smaller, and the output terminals 346A and 347A open again.

Thus, along with the rotation of the XI roller 325, the lever 336A repeats to rotate with resisting the elastic force, i.e., elastic displacement and restoration, and the switch 335A generates an electric signal synchronized with the click feel four times in one rotation of the XI roller 325. This signal is transmitted to a circuit of the electronic apparatus through the output terminals 346A, 347A of the switch 335A.

With this signal, the rotating speed of the XI roller 325, that is, the moving distance of the cursor on the display screen of the electronic apparatus employing the track ball device in a positive direction or negative direction of X-axis is detected.

By the rotation of the ball 308 in the left direction, on the other hand the four pins 332 projecting to one end of the XII roller 326 push the leading end 338B of the lever 336B of the switch 335B in a direction to the root. However, the lever 336B does not move in this direction, and the pins 332 do not move. That is, since the XII roller 326 does not rotate, the ball 308 slips at the contacting portion 326A. Hence, the rotary switch 335B does not operate to generate the electric signal.

With a rotation of the ball 308 in a right direction, the XI roller 325 does not rotate, the XII roller 326 rotates, and the moving distance of the cursor on the display screen in the X-axis direction is detected.

A rotation of the ball 308 in the front-and-back direction is not transmitted to the XI roller 325 and XII roller 326, but is transmitted to the YI roller 327 or YII roller 328, and the moving distance of the cursor in the Y-axis direction is detected.

An oblique rotation of the ball 308 makes either XI roller 325 or XII roller 326, and either YI roller 327 or YII roller 328 rotate depending on the rotating direction and rotating amount of the ball 308, and the moving distance in the X-axis and Y-axis directions is detected.

In this explanation, the four pins 331 to 334 project radially at one end of the rollers 325 to 328. That is, four signals are generated in one rotation of each one of the rollers 325 to 328, but the number of times can increases or decreases as required.

Thus, according to this embodiment, in addition to the effects in embodiment 1, the self-resetting switches 335A to 335D of push operation type are driven by the pins 331 to 334 provided in the rollers 325 to 328. As a result, the rotating direction regulating units and rotation amount detecting units are formed integrally, so that a compact and inexpensive track ball device can be obtained.

Further, through the track ball device explained in embodiment 1 or 2 mounted on an operation panel of an electronic apparatus, information displayed on a display unit such as liquid crystal display is selected by rotating the ball, so that the electronic apparatus operating according to the selected information is obtained. In this electronic apparatus, the cursor on the display units and the information to be displayed can be manipulated precisely. In addition, the ball, since hardly slipping at the contact area between the rollers, generates a clear click feel and has a small rotary play angle, thereby providing an electronic apparatus excellent in controllability capable of executing a function corresponding to the information promptly.

Embodiment 3

Figure 15:
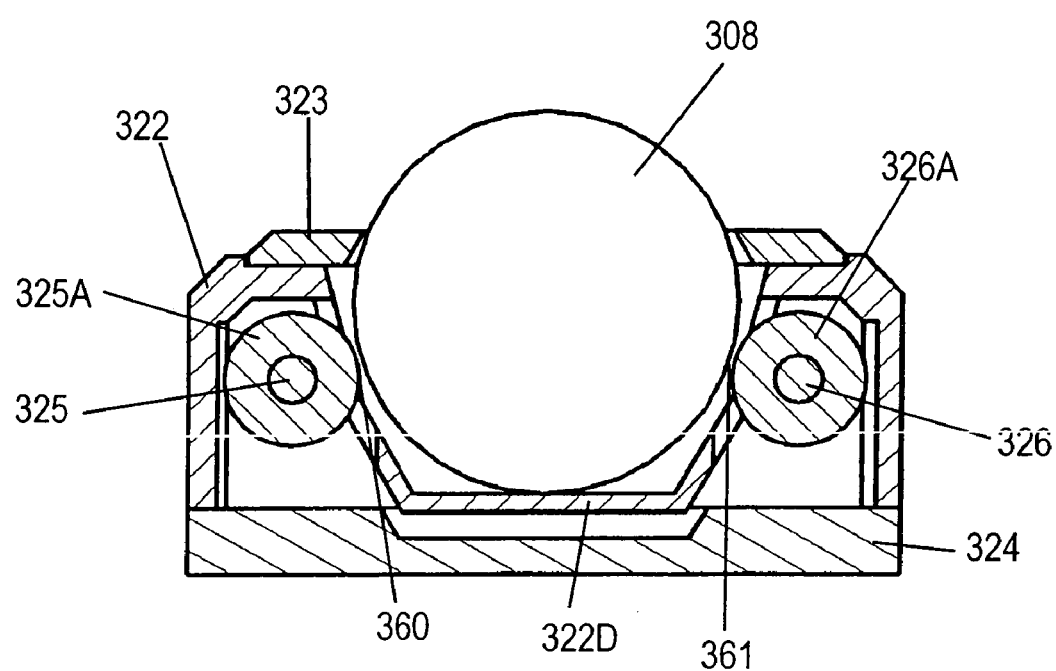
FIG. 15 is a sectional view of a track ball device according to embodiment 3 of the invention.
Figure 16:
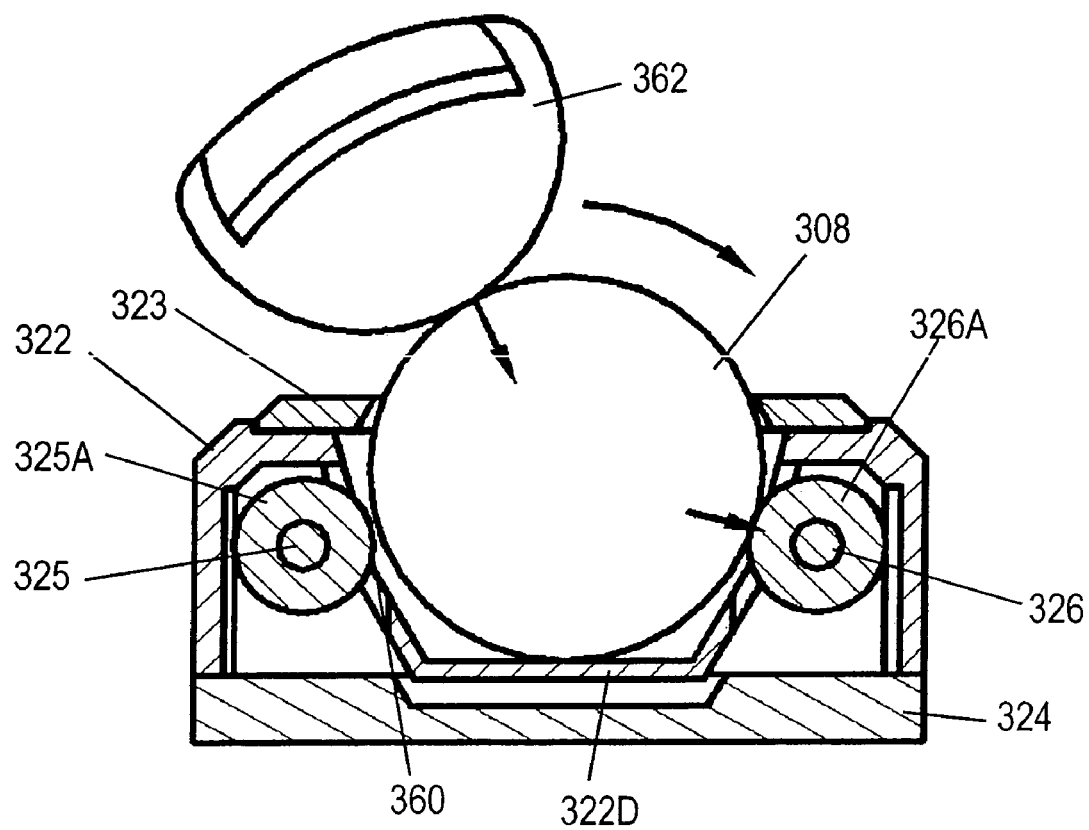
FIG. 16 is a sectional view of the operated track ball device according to embodiment 3.

FIG. 15 is a sectional view of a track ball device in embodiment 3 of the invention, and FIG. 16 is a sectional view of the operated track ball device.

Similarly to embodiment 1, the track ball device of this embodiment includes four circular shaft rollers disposed in two sets of two opposing rollers in orthogonal to each other on the top of a base unit 324 made of resin. In FIG. 15 and FIG. 16, only XI roller 325 and XII roller 326 of the four rollers are shown.

The track ball device of this embodiment has the ball 308 easily rotatably supported in a dish 322D at a center of a bowl unit 322A of a case 322. While not being manipulated, the ball 308 does not contact with contacting portions 325A, 326A, so that gaps 360, 361 can be formed between the ball 308 and the contacting portions 325A, 326A of the rollers 325, 326.

As shown in FIG. 16, when the track ball device is manipulated, the ball 308 is pushed with a finger 362 of a user, and contacts with the contacting portion 326A on the outer circumference of the opposite side of the pushed portion about the center of the ball. Along with a rotation of the ball 308, the pushed contacting portion 326A rotates. In this mechanism, only the contact portion in a direction desired to operate by the user contacts with the ball, so that the roller can rotate in one direction only.

This track ball device may have a rotating direction regulating unit of rollers. The rotating direction regulating unit may be the same as in embodiment 1 or 2, but may have a simple structure as explained above. Besides, since having nothing to impede the rotation of the ball such as the roller having a rotation regulated by the rotating direction regulating unit, the track ball device is smoothly manipulated.

Embodiment 4

Figure 17:
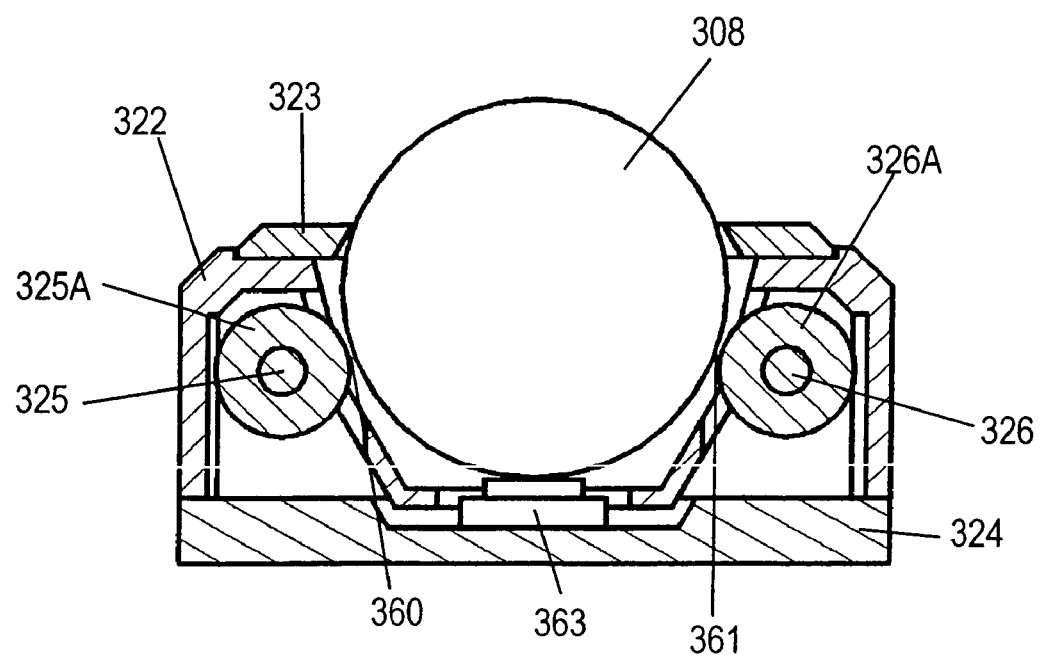
FIG. 17 is a sectional view of a track ball device according to embodiment 4 of the invention.
Figure 18:
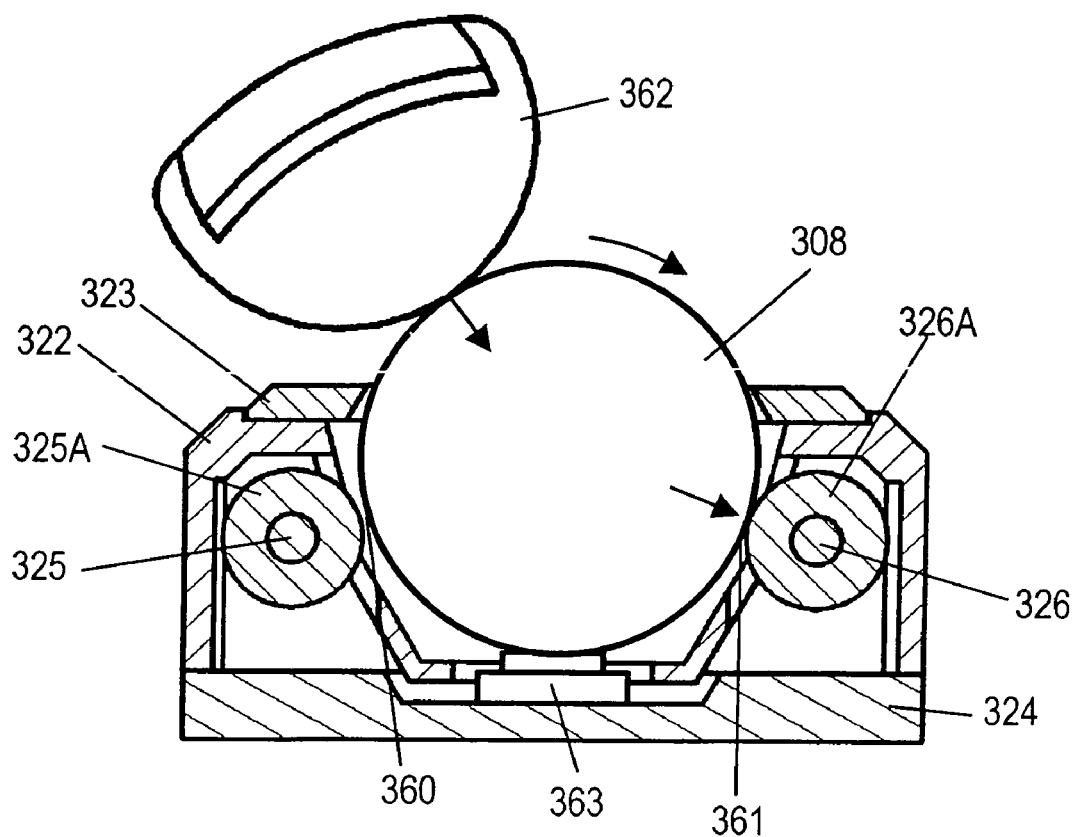
FIG. 18 is a sectional view of an operated track ball device according to embodiment 4.
Figure 19:
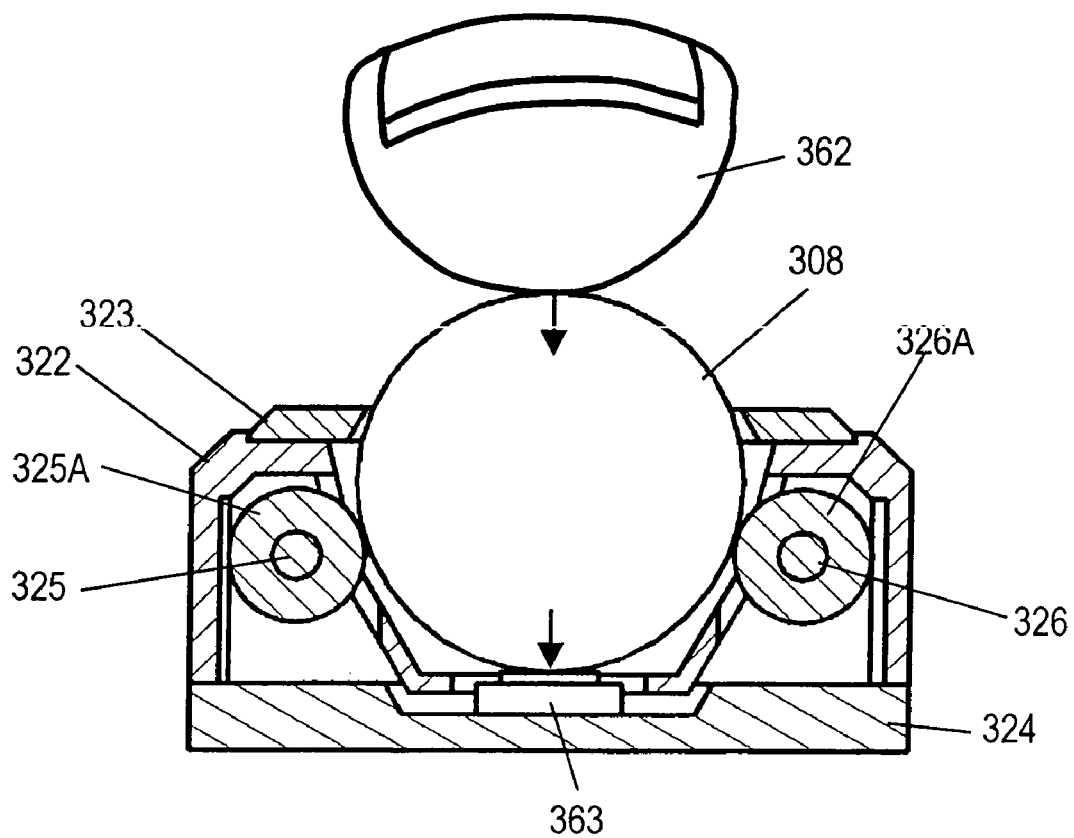
FIG. 19 is a sectional view of an operated track ball device according to embodiment 4.

FIG. 17 is a sectional view of a track ball device in embodiment 4 of the invention, and FIG. 18 and FIG. 19 are sectional views of the operated track ball device.

Similarly to embodiment 1, the track ball device of this embodiment has four circular shaft rollers disposed in two sets of two opposing rollers in orthogonal to each other on the top of a base unit 324 made of resin. FIG. 17 to FIG. 19 show only XI roller 325 and XII roller 326 out of the four rollers.

The track ball device of this embodiment includes a self-resetting push switch disposed on the base unit 324 for easily supporting the ball 308 rotatably. While not being manipulated, the ball 308 does not contact with contacting portions 325A, 326A, so that gaps 360, 361 can be formed between the ball 308 and the contacting portions 325A, 326A of the rollers 325, 326.

As shown in FIG. 18, when the track ball device is manipulated, the ball 308 is pushed by a finger 362 of a user, and contacts with the contacting portion 326A on the outer circumference of the opposite side of the pushed portion about the center of the ball. Along with the rotation of the ball 308, the pushed contacting portion 326A rotates. In this mechanism, only the contact portion in the direction desired to operate by the user contacts with the ball, so that the roller can rotate in one direction only.

In the track ball device of this embodiment, as shown in FIG. 19, the switch 363 can be pushed only by the ball 308 pushed down by the finger 362 of the user. Therefore, the user, by rotating the ball 308, can move a position of a cursor on a display screen of an electronic apparatus having this track ball device, and transmit, through pushing the switch 363 by pressing the ball 308, a signal indicating that the position is recognized.

This track ball device may have a rotating direction regulating unit for rollers. The rotating direction regulating unit may be the same as in embodiment 1 or 2, but may has a simple structure as explained above. The track ball device, since having nothing to impede the rotation of the ball such as the roller having a rotation regulated by the rotating direction regulating unit, is smoothly manipulated device.

Embodiment 5

Figure 20:
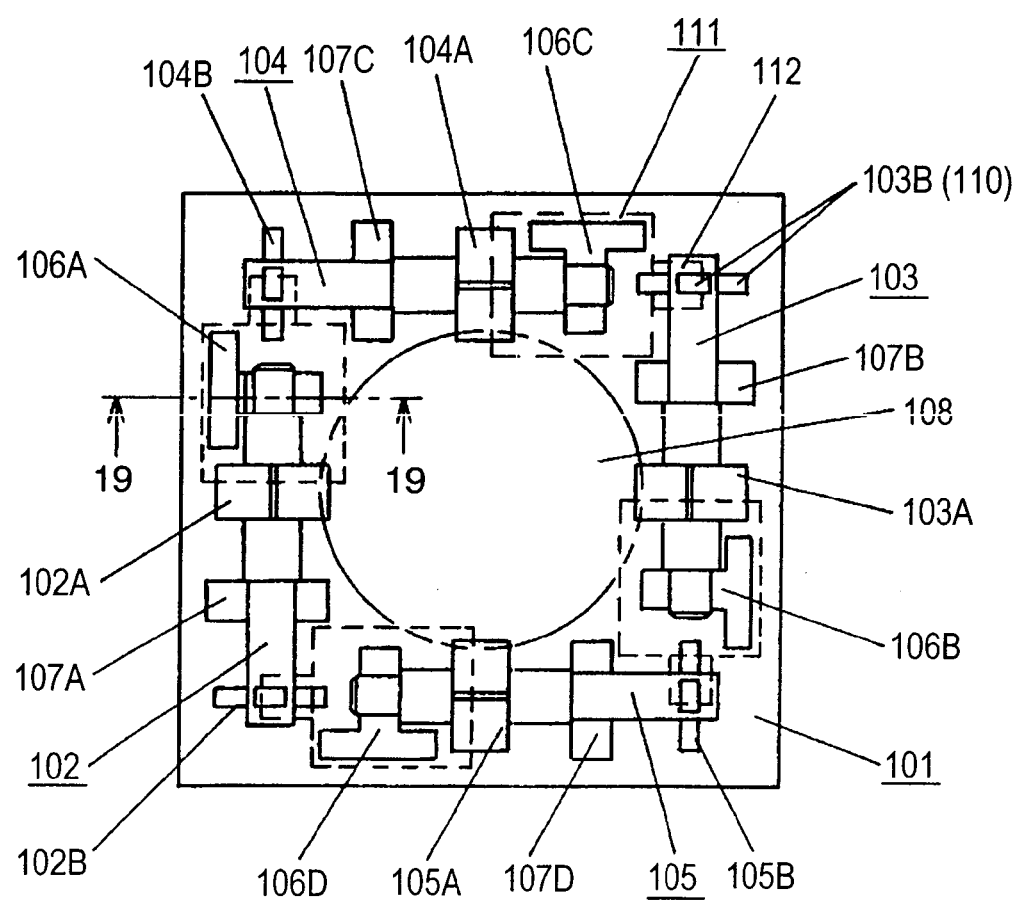
FIG. 20 is a plan view of a track ball device having a case excluded according to embodiment 5 of the invention.
Figure 21:
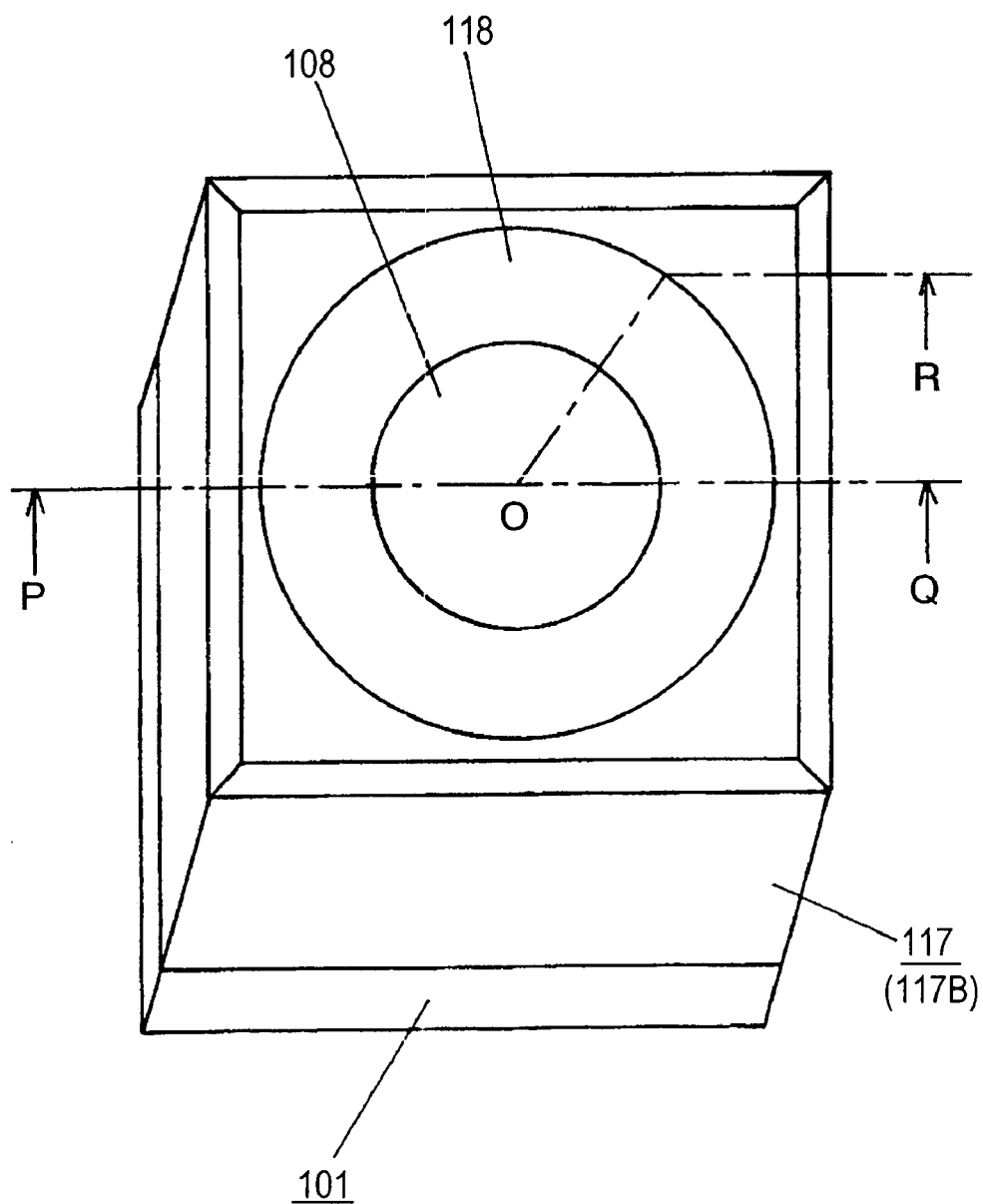
FIG. 21 is a perspective outline view of the track ball device according to embodiment 5.
Figure 22:
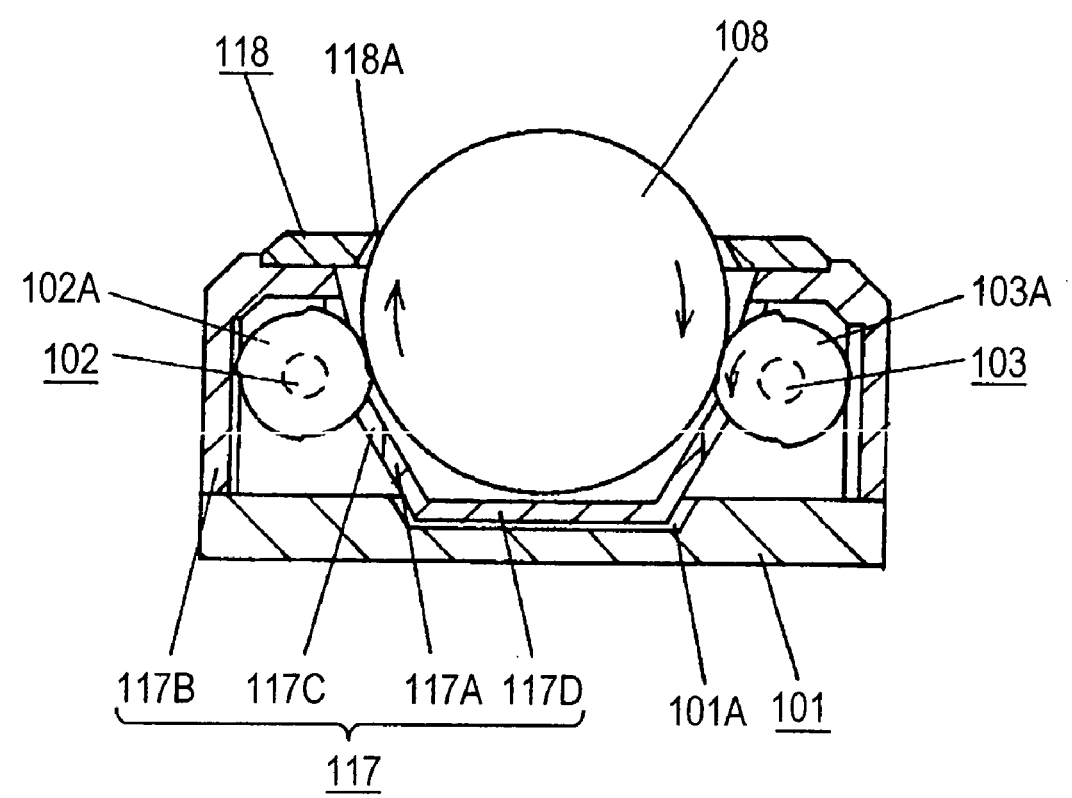
FIG. 22 is a sectional view at a line P-O-Q of the track ball device in FIG. 21.

FIG. 20 is a plan view of a track ball device having a case excluded according to embodiment 5 of the invention, and FIG. 21 is a perspective outline view of the device. FIG. 22 is a sectional view at a line P-O-Q of the track ball device in FIG. 21, and FIG. 23 is a sectional view at a line P-O-R of the track ball device in FIG. 21.

A base unit 101 of the track ball device is made of resin in a square shape as seen from the top. Near each side of the square shape, as shown in FIG. 20 and FIG. 22, four cylindrical XI roller 102, XII roller 103, and YI roller 104, YII roller 105 are disposed in a square shape in two sets of two opposing rollers in orthogonal to each other. The four rollers are rotatably supported by support units 106A to 106D, and 107A to 107D formed unitarily with the base unit 101.

Figure 23:
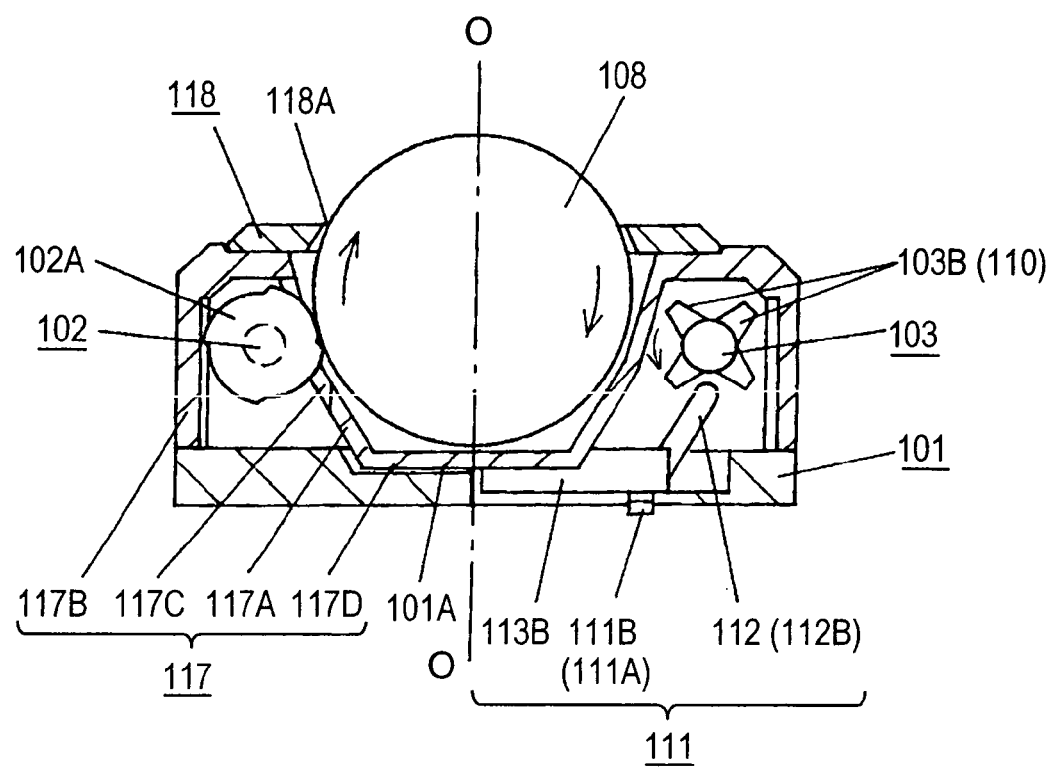
FIG. 23 is a sectional view at a line P-O-R of the track ball device in FIG. 21.

As indicated by a double dot chain line in FIG. 20 and solid line in FIG. 22 and FIG. 23, the outer circumference positioned slightly lower than the center of a ball 108, an operating element of the track ball device, contacts with contacting portions 102A, 103A, and 104A, 105A provided at the middle of the rollers, i.e., XI roller 102, XII roller 103, YI roller 104, and YII roller 105. The rollers supports the ball 108 rotatably in all directions.

Each of sections of the contacting portions 102A to 105A of the XI roller 102 to YII roller 105 is a circular sawtooth profile, as shown in FIG. 22 and FIG. 23, having four undulations at intervals of 90 degrees on the circumference. The direction of sawtooth is mutually opposite between the confronting XI roller 102 and XII roller 103 as shown in FIG. 22. A sawtooth direction between the confronting YI roller 104 and YII roller 105 is similar.

As a result, when the ball 108 rotates in a direction of climbing up along the slope from a recess to a bump of the circular sawtooth profile of the rollers, the rotation is transmitted since the rotary torque increases gradually. And then, the ball 108, upon falling at a step difference from the bump to the next recess, generates a clear click feel.

At the confronting rollers, the ball 108 rotates in a direction of running over a nearly vertical step difference from a recess to a bump of the circular sawtooth profile. In this case, the ball 108 cannot run over the vertical step, and idles at the recess at the step, and rotation of the ball 108 is not transmitted to the confronting roller, so that rotation of the roller may be regulated.

Since the recess of the circular sawtooth section of each of the contacting portions 102A to 105A of the rollers 102 to 105 is contacting with the outer circumference of the ball 108, in the ordinary state shown in FIG. 22, the rotary play angle of the ball 108 is small.

Figure 24:
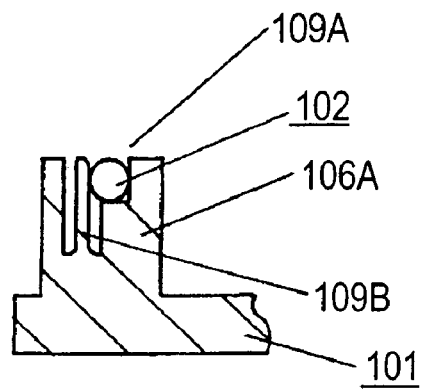
FIG. 24 is a sectional view at a line 19—19 of the track ball device in FIG. 20.

Besides, as shown in FIG. 24, a sectional view along line 19—19 in FIG. 20, an elastic leg 109B is disposed in a support recess 109A in the support unit 106A for supporting the XI roller 102. The elastic leg 109B applies a light pressure to have the opposing interval of the XI roller 102 and XII roller 103 narrower than a specified interval.

The pressure of elastic leg 109B pushing the XI roller 102 is small. Therefore, the XI roller 102, when being pushed by the own weight of the ball 108 and the pressure of the rotating ball 108, is positioned at a widened interval against the XII roller 103. As a result, the ball 108 contacts securely with four rollers including the YI roller 104 and YII roller 105. That is, even if the rollers located mutually in parallel are positioned with fluctuation in interval or height, the ball 108 securely contacts with the four rollers. As required, like the elastic leg 109B of the support unit 106A, similar elastic legs may be provided in other support units 106B to 106D.

At each end of the rollers 102 to 105, as shown in FIG. 20 and FIG. 23, drive cams 102B to 105B having four drive pins 110 projecting at intervals of 90 degrees are provided. Along with a rotation of the rollers 102 to 105, the drive pin 110 pushes a lever 112 of a switch 111, a rotation amount detecting unit, mounted on the base unit 101. The switch 111 is shown by dotted line in FIG. 20, and the side view is shown in FIG. 23. The angular positions of four drive pins 110 of the cams 102B to 105B are synchronized with the four undulation positions of the circular sawtooth section of the contacting portions 102A to 105A of the rollers 102 to 105.

Figure 25:
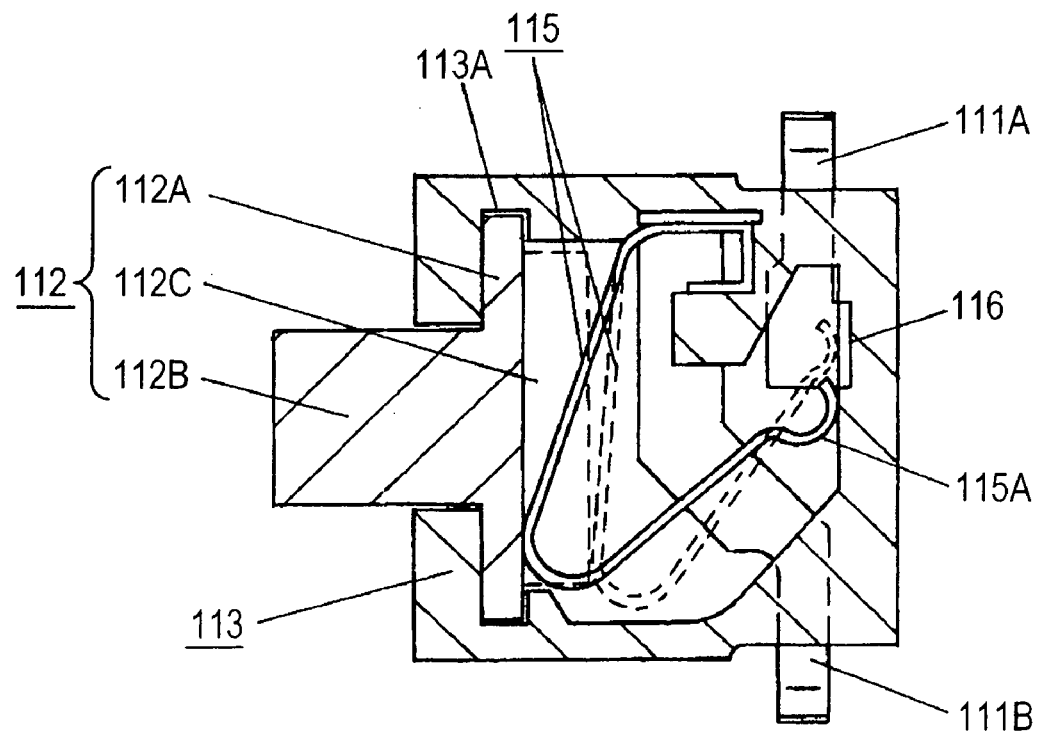
FIG. 25 is a sectional view of the track ball device having a cover of a switch excluded according to embodiment 5.
Figure 26:
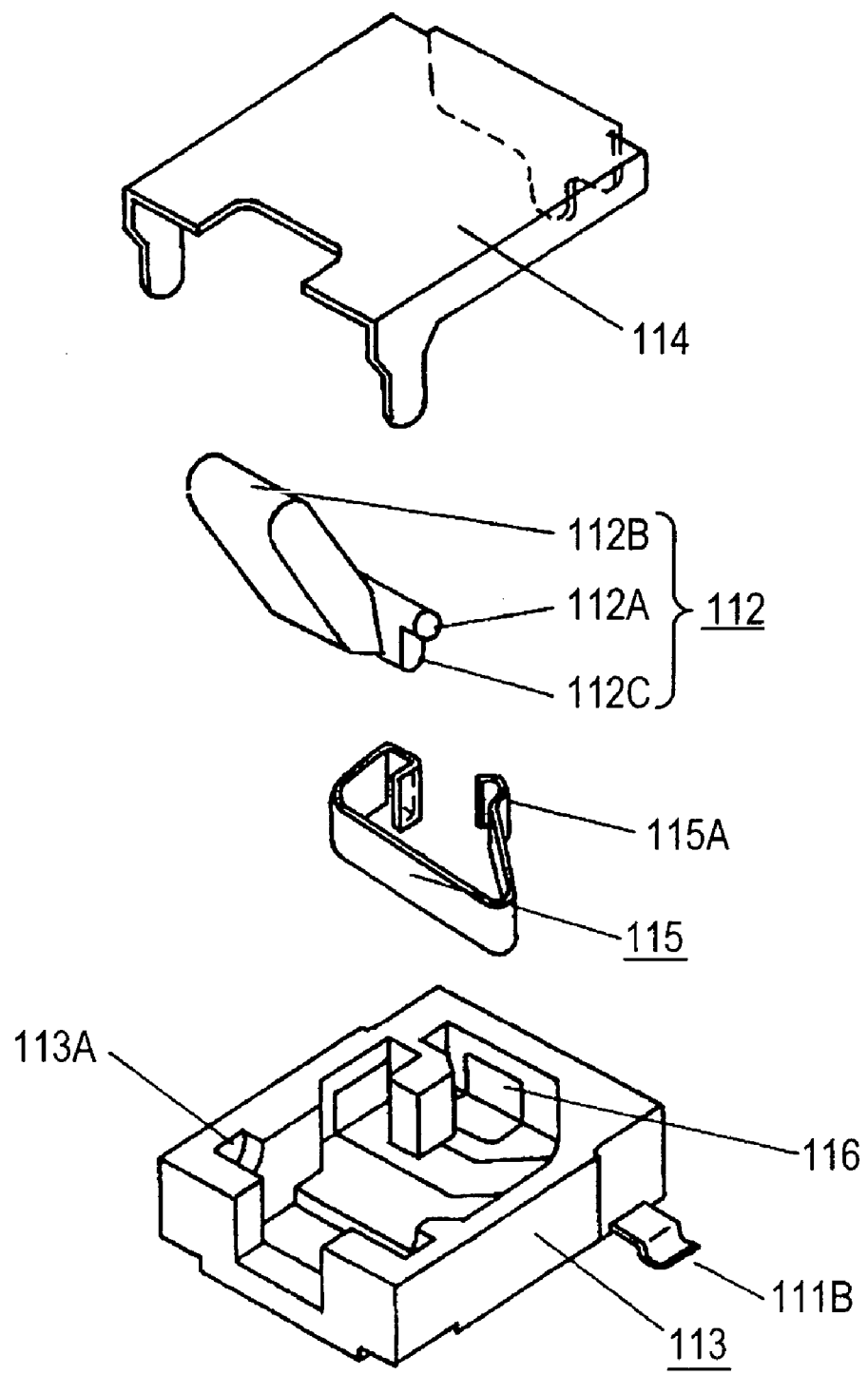
FIG. 26 is a perspective view of a disassembled switch of the track ball device according to embodiment 5.

The switch 111, the rotation amount detecting unit is a thin self-resetting switch of push operation type. FIG. 25 is a sectional view of the switch 111 without a cover, and FIG. 26 is a perspective view of the disassembled switch. As shown in the diagrams, a support recess 113A and cover 114 provided at the upper end of a switch case 113 rotatably support the shaft 112A of the lever 112. When having a leading end 112B pushed down to a specified position, the lever 112 rotates about the shaft 112A. As a result, as indicated by dotted line in FIG. 25, a driving portion 112C pushes and deforms elastically a movable contact 115 made of a thin elastic metal plate accommodated in the switch case 113. And thus, the contact point 115A contacts with the fixed contact 116, so that the output terminals 111A and 111B may conduct to each other. When the pushing force on the lever 112 is removed, the lever 112 returns to the original state by the elastic restoring force of the movable contact 115.

The output terminals 111A, 111B of the switch 111 are made of thin elastic metal plates, and project to the lower side of the base unit 101. This track ball device is pushed to be fixed to a circuit board of an electronic apparatus. At this moment, the output terminals 111A, 111B elastically contact with the circuit board and are electrically connected to the board.

FIG. 22 shows an ordinary state of the recess of the circular sawtooth section of the contacting portions 102A to 105A of the XI roller 102 to YII roller 105 contacting with the outer circumference of the ball 108. In this ordinary state, cams 102B to 105B of the rollers 102 to 105 are stopped at a position where the drive pin 110 may not touch the lever 112 of the switch 111 as shown in FIG. 23.

In FIG. 21 to FIG. 23, the case 117 and lid plate 118 covering these members are made of resin.

The case 117 is, as shown in FIG. 22 and FIG. 23, composed of a bowl unit 117A which opens at the upper end and is disposed to envelope the lower portion of the ball 108, and a peripheral wall 117B which extends downward from the outer circumference of the upper end and fixed to the base unit 101 at the lower end. The bowl unit 117A has four through-holes 117C provided at positions where the central contacting portions 102A to 105A of the rollers 102 to 105 contact with the outer circumference of the ball 108. The center of the bowl unit 117A is a dish 117D, which is accommodated in a dent 101A in the center of the base unit 101. Therefore, even if water splashes over the track ball device, the four switches 111 on the base unit 101 is not affected from the water.

Figure 27:
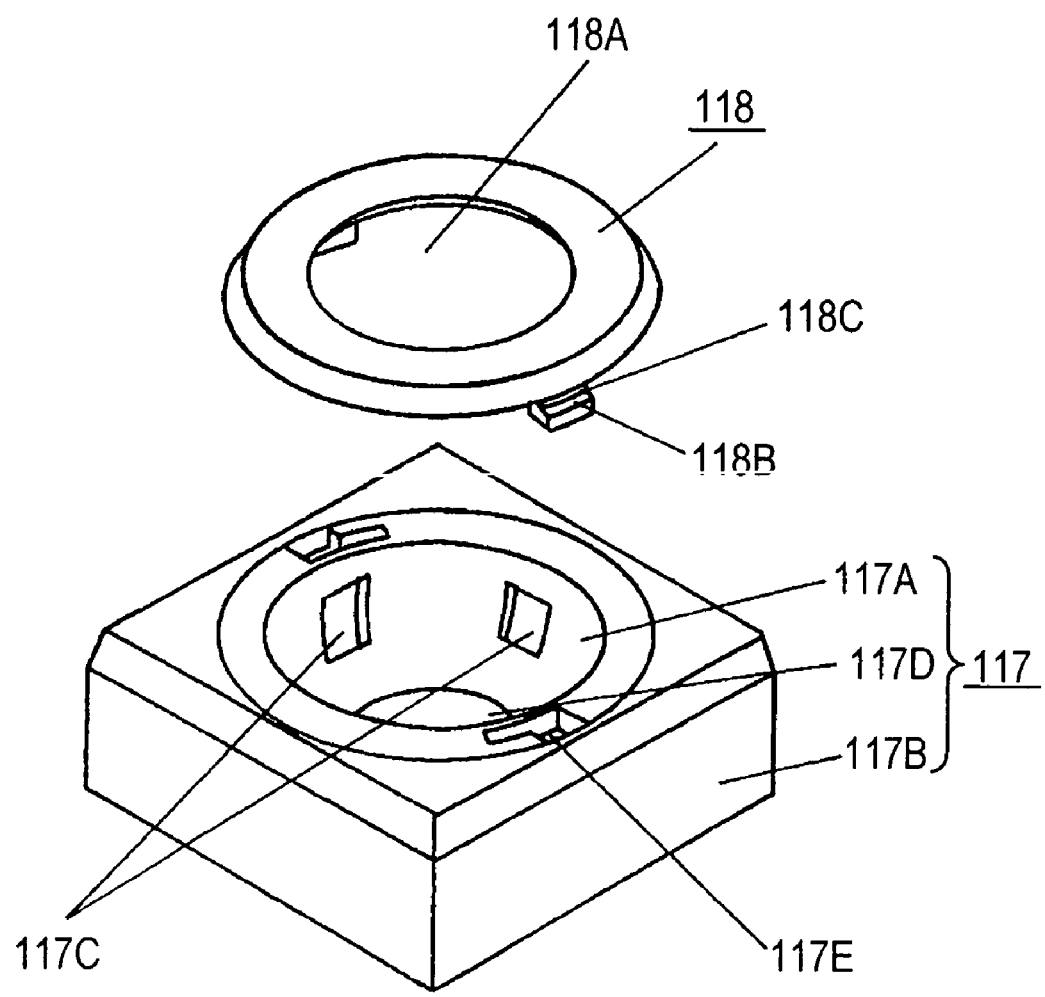
FIG. 27 is a perspective outline view of a coupling portion of a lid plate and a case of the track ball device according to embodiment 5.

The lid plate 118 is, as shown in FIG. 22, FIG. 23 and a perspective outline view in FIG. 27, formed like a ring having, at the center, a circular hole 118A slightly smaller than the diameter of the ball 108 to allow the upper portion of the ball to project. Two legs 118C having steps 118B at the lower side are respectively inserted into two coupling holes 117E at the upper end of the case unit 117. Further, the lid plate 118, when being turned, is detachably coupled with the case 117, thereby preventing the ball 108 from being displaced from the track ball device in ordinary state. The lid plate 118, upon being removed, allow the ball 108 to be replaced.

An operation of the track ball device of the embodiment having such configuration will be explained below.

In the ordinary state shown in FIG. 22 and FIG. 23, the operation will be explained where the ball 108 is rotated in a right direction as indicated by an arrow in the diagrams by touching the top of the ball 108, an operating element projecting upward from the circular hole 118A of the lid plate 118 of the track ball device by a hand or finger. The rotation is not transmitted to the YI roller 104 and YII roller 105 out of the four rollers, XI roller 102 to YI roller 105, contacting with the contacting portions 102A to 105A on the outer circumference of the ball 108. Since the contacting portions 102A and 103A of XI roller 102 and XII roller 103 have opposite directions of circular sawtooth serrations, as mentioned above, the XII roller 103 on which the ball 108 climbs along the slope from the recess to the bump of the circular sawtooth section rotates. The rotation is regulated in the XI roller 102 on which the ball 108 must run over a nearly vertical step difference from the recess to the bump of the circular sawtooth section, and the ball 108 idles in the recess at the step.

Figure 28:
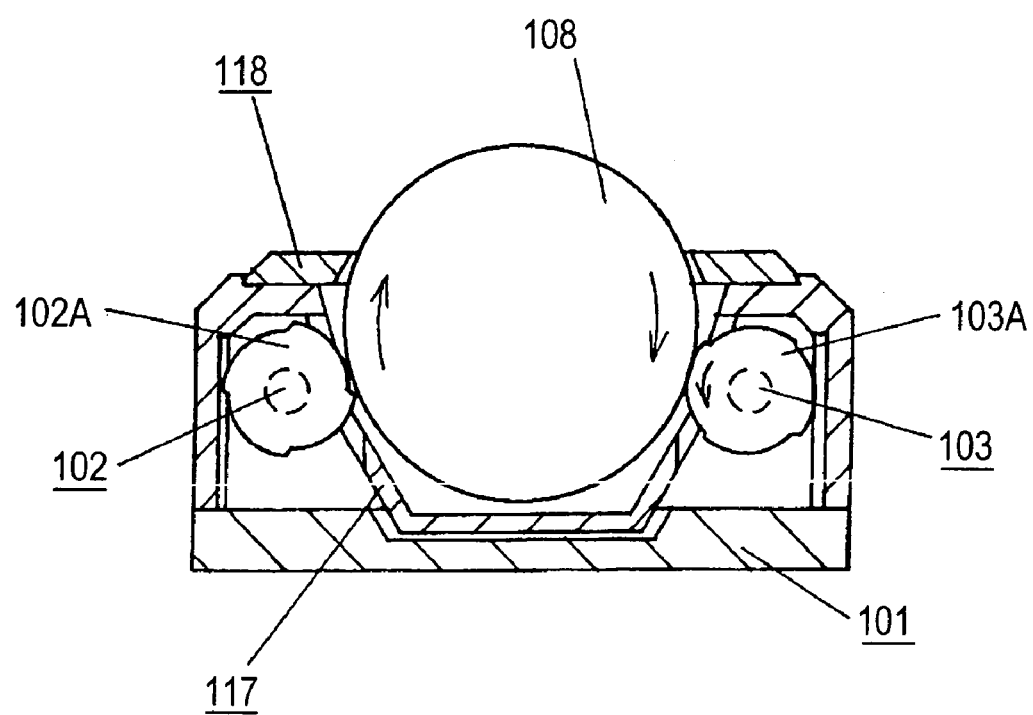
FIG. 28 is a sectional view at a line P-O-Q of the track ball device in FIG. 21 having a ball rotated.
Figure 29:
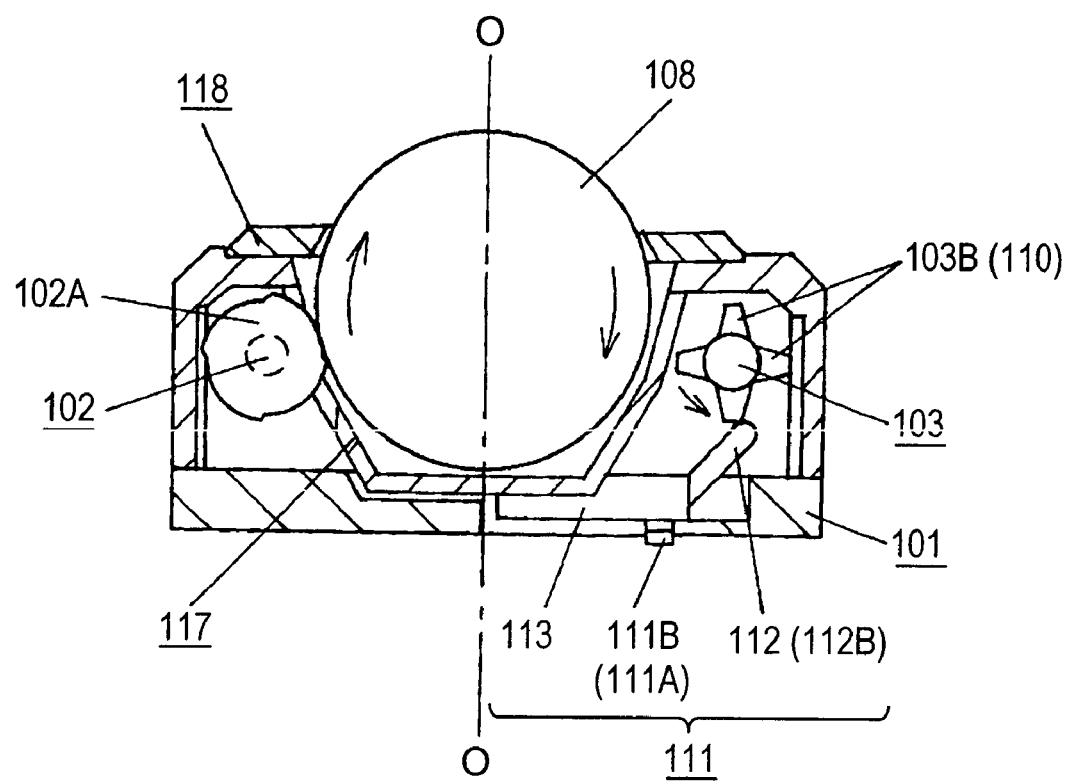
FIG. 29 is a sectional view at a line P-O-R of the track ball device in FIG. 21 having a ball rotated.

Accordingly, as shown in the sectional view in FIG. 28, as the ball 108 climbs up along the slope from the recess to the bump of the circular sawtooth section of the contacting portion 103A while rotating the XII roller 103, the cam 103B at the end of the XII roller 103 rotates. When the cam 103B rotates by a specified angle, as shown in the sectional view in FIG. 29, one drive pin 110 pushes down the lever 112 of the switch 111. Therefore, as shown in FIG. 25, the contact point 115A of the movable contact 115 of the switch 111 contacts with the fixed contact 116 to conduct. When the XII roller 103 further rotates to fall from the bump to the next recess while generating a click feel, the drive pin 110 is dislocated from the lever 112 of the switch 111. As a result, the lever 112 returns to an original state in FIG. 23 by the elastic restoring force of the movable contact 115, and the movable contact 115 is displaced from the fixed contact 116, thereby being turned-off again.

In succession, the XII roller 103, upon continuing to rotate, makes the next drive pin 110 of the cam 103B similarly turn on and off the switch 111.

In this manner, the switch 111 turns on and off four times in synchronism with a click feel during one rotation of the XII roller 103, and the turned on/off is transmitted to a circuit of the electronic apparatus employing the track ball device through the output terminals 111A, 111B. As a result, the number of rotations of the XII roller 103, i.e., a moving distance of a cursor on a display screen of the electronic apparatus in either positive or negative direction of the X-axis is detected.

Similarly, by rotation of the ball 108 in the left direction, the XII roller 103 is regulated to rotate, while the XI roller 102 is free to rotate. Therefore, the moving distance of the cursor on the display screen in a reverse direction to that for a rotation in the right direction is detected. By a rotation in front-and-back directions, the rotation of the ball is not transmitted to the XI roller 102 and XII roller 103, but is transmitted to the YI roller 104 or YII roller 105, and thereto, the moving distance of the cursor in either positive or negative direction of the Y-axis is detected.

By an oblique rotation of the ball 108, either XI roller 102 or XII roller 103, and either YI roller 104 or YII roller 105 rotate depending on the XY direction component of the rotation, and the cursor moving distance in each direction of the X-axis and Y-axis is detected.

In this explanation, the cams 102B to 105B of the XI roller 102 to YII roller 105 of the track ball device have four drive pins 110 at 90-degree intervals. That is, the switch is turned on and off four times in one rotation of each one of the rollers 102 to 105. The number of pins, that is, the number of times of turning on and off the switch can increase and decrease as required.

Herein, the contacting portions 102A to 105A of the XI roller 102 to YII roller 105 have a circular sawtooth section.

Figure 30:
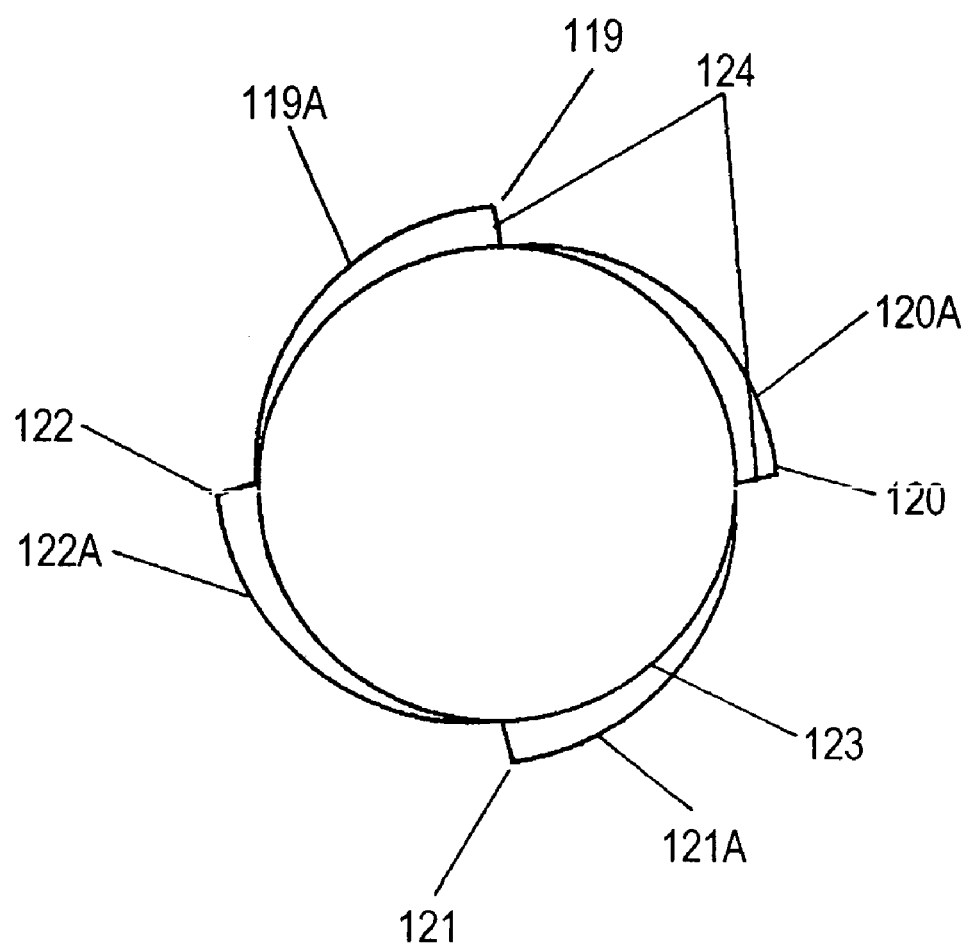
FIG. 30 shows a sectional shape of a contacting area of a roller of the track ball device according to embodiment 5.

FIG. 30 shows a sectional shape of the contacting portion. In the direction of four undulations 119 to 122, four arcs 119A to 122A formed by deviating the center of the reference circle 123 by a step 124 are overlaid. So as to form the step 124 having a specified dimension between the adjacent arcs at the undulations 119 to 122, the outer circumference of the arcs 119A to 122A is cut off in a specific rotating direction from the center of the rollers 102 to 105. As a result, the contacting portions 102A to 105A of the rollers 102 to 105 are formed easily. Further, to the roller rotating in the rotating operation direction of the ball 108, the rotation torque is transmitted smoothly at an almost constant magnitude from the ball 108 along the outer circumference of the arcs 119A to 122A from the recess to the bump of the circular sawtooth section. Therefore, the track ball device manipulated with smooth feel and stable motion is obtained. Further, the click feel of a rotating roller, and the stopping force of a stopped roller can be adjusted with a size or inclination of the step 124 between the adjacent arcs.

Thus, the track ball device according to the embodiment, when having the ball 108 manipulated, generates a click feel, and can move a cursor on a display screen of the electronic apparatus precisely. The track ball device, moreover, allows the ball 108 to hardly slip between the contacting portions 102A to 105A of the rollers 102 to 105, and thus having a small rotary play angle.

Further, the ball 108, upon having the entire surface coated with a film of an elastic material, increases a frictional force between the contacting portions 102A to 105A of the rollers 102 to 105. As a result, the ball slips hardly in this area, and hardly generates a static electricity due to the slipping.

Further, the ball 108, upon having fine recesses formed on the entire surface, prevents a hand or finger from slipping hardly on the surface of the ball 108 for the manipulation, so that an easy-to-manipulate track ball device can be obtained.

Embodiment 6

Figure 31:
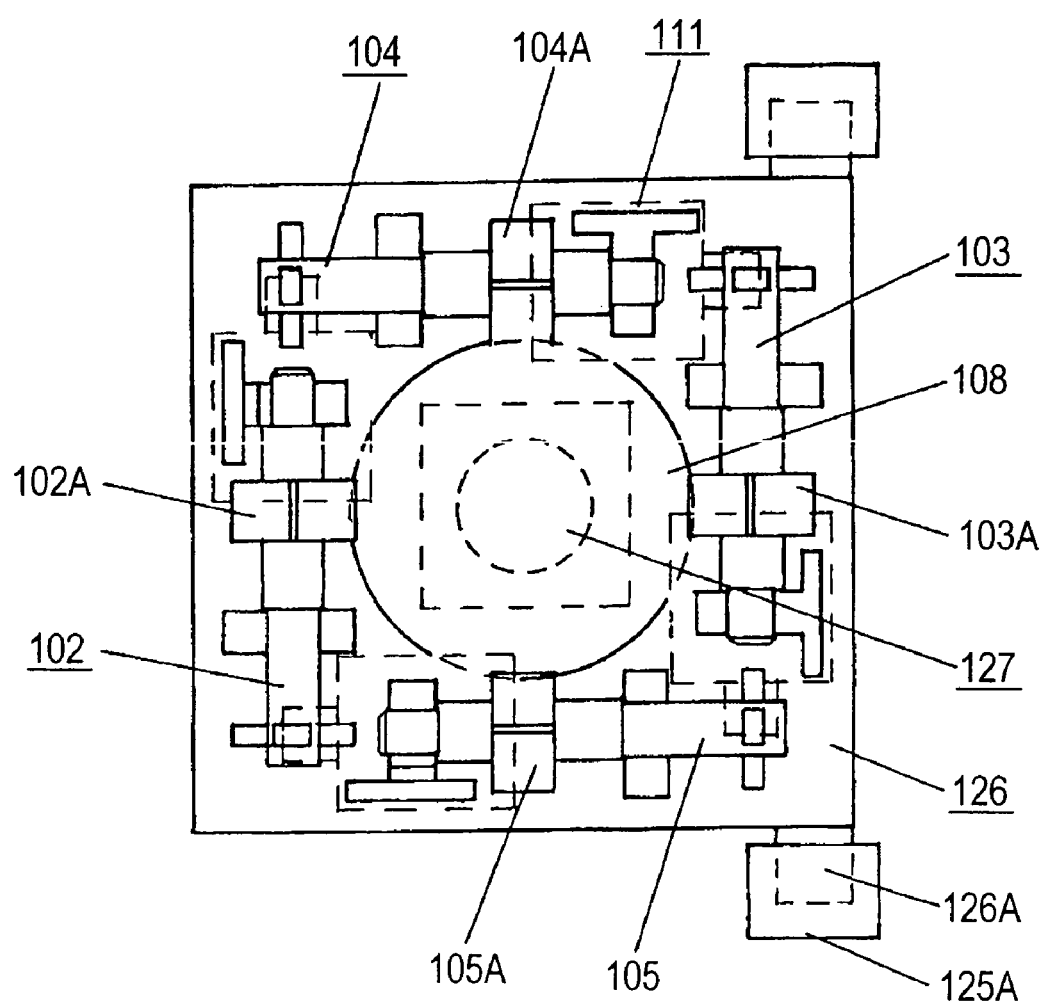
FIG. 31 is a plan view of a track ball device having a case excluded according to embodiment 6 of the invention.
Figure 32:
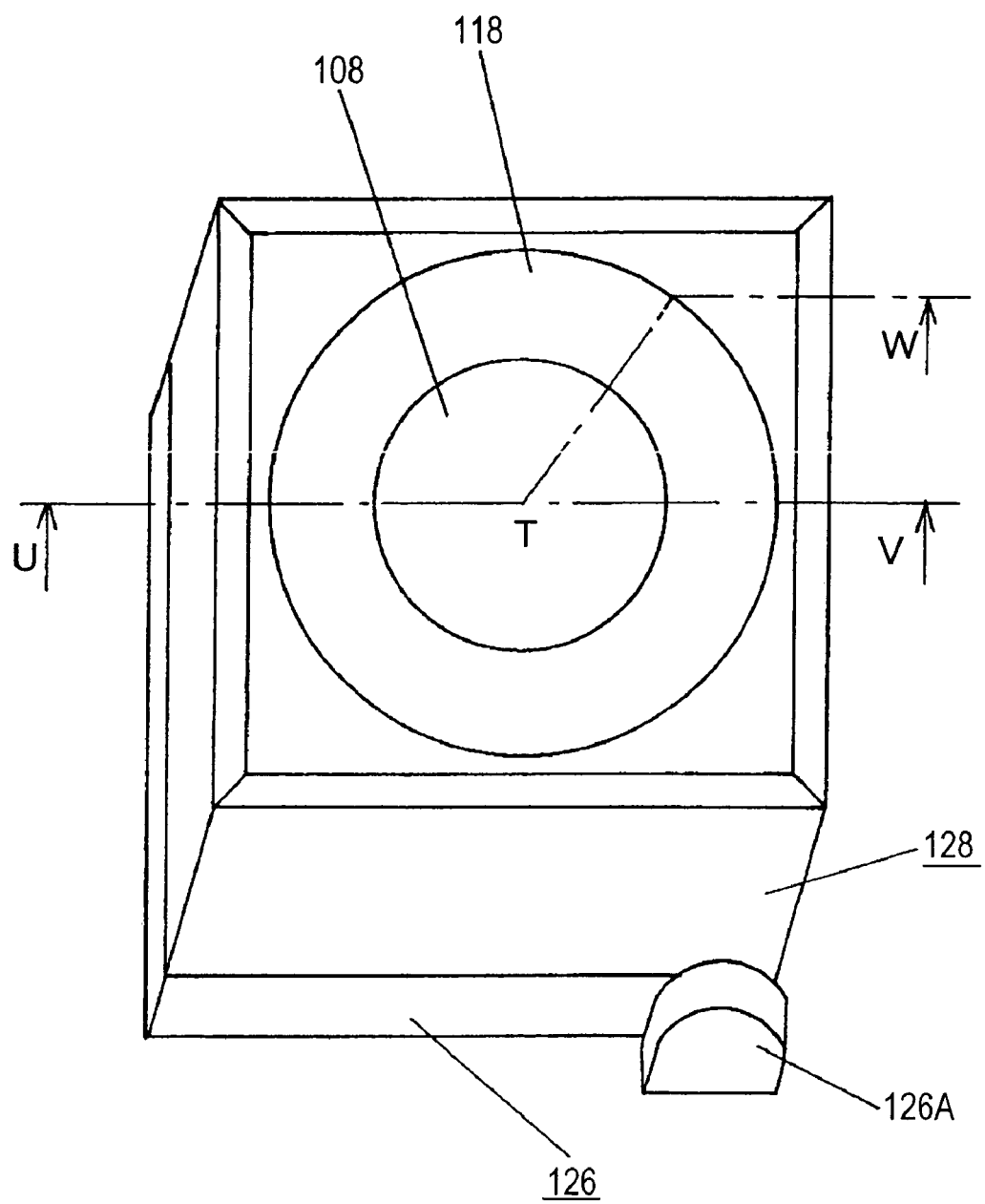
FIG. 32 is a perspective outline view of the track ball device according to embodiment 6.
Figure 33:
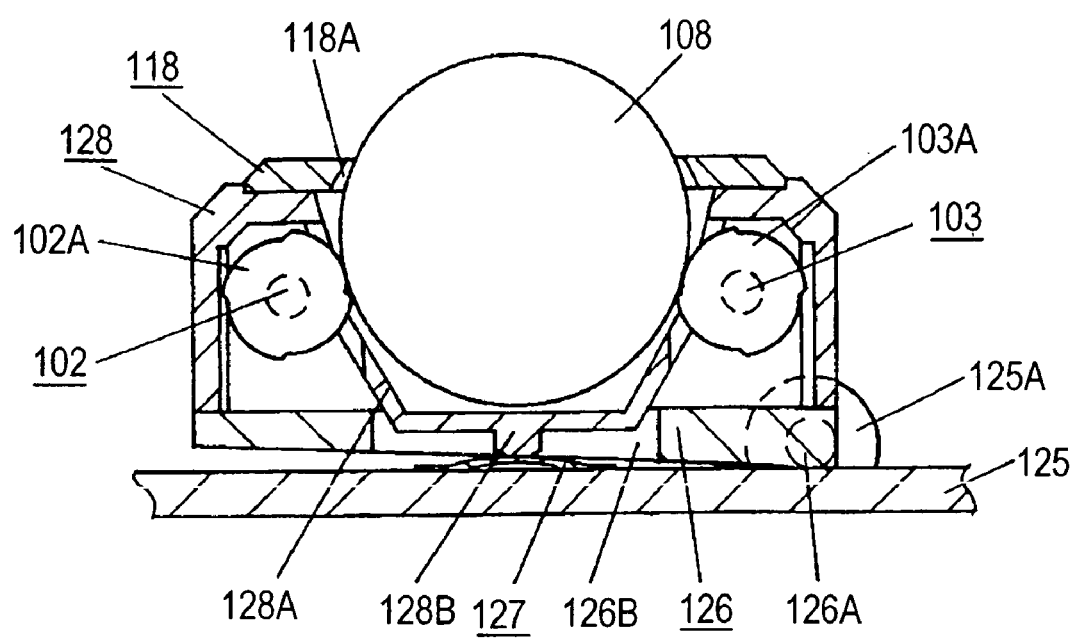
FIG. 33 is a sectional view at a line U-T-V of the track ball device in FIG. 32.
Figure 34:
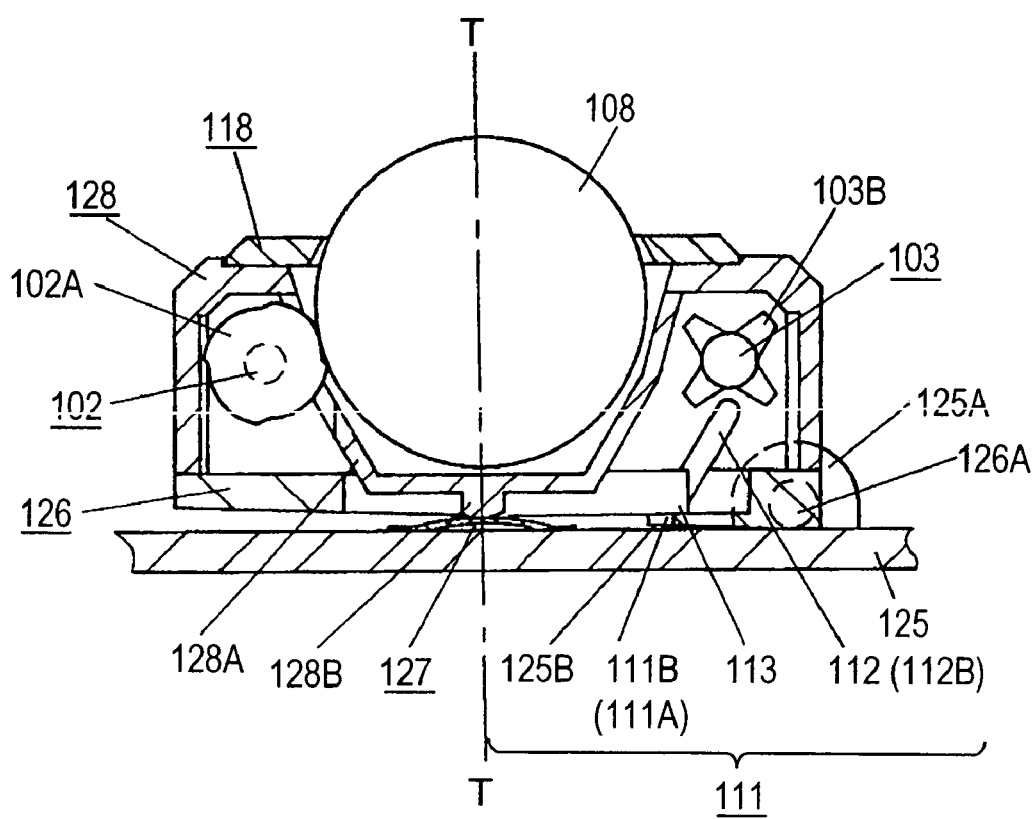
FIG. 34 is a sectional view at a line U-T-W of the track ball device in FIG. 32.

FIG. 31 is a plan view of a track ball device having a case excluded according to embodiment 6 of the invention, and FIG. 32 is a perspective outline view of the device. FIG. 33 is a sectional view at a line U-T-V of the track ball device in FIG. 32, and FIG. 34 is a sectional view at a line U-T-W of the track ball device in FIG. 32. The track ball device according to embodiment 6 has a base unit 126 rotatably supported by a circuit board 125 of an electronic apparatus employing the device, and has a self-resetting push switch 127 disposed on the circuit board 125 beneath the base unit 126.

That is, the base unit 126 having a square shape as seen from the top is supported, by a holding portion 125A provided on the circuit board 125, rotatably about a rotary support shaft 126A in the lower portion at one side thereof. The self-resetting push switch 127 is disposed on the circuit board 125 corresponding to a circular hole 126B formed at the center of the base unit 126. Over the center of the switch 127, a protrusion 128B provided at the lower end of a bowl unit 128A of a case 128 fixed to the base unit 125 contacts with the switch, and the base unit 126 is held at the upper end of the rotating range of the base unit. The base unit 126 incorporates XI roller 102 to YII roller 105 for supporting the ball 108 rotatably in all directions, four switches 111 for detecting rotating amount of the rollers, and the case 128.

Elastic output terminals 111A, 111B coming out of the four switches 111 mounted on the base unit 126 are elastically connected to plural connection points 125B on the circuit board 125, and push up the base unit 126, so that the base unit 126 can be disposed stably.

Figure 35:
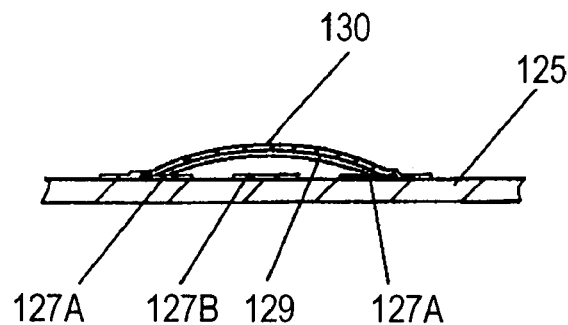
FIG. 35 is a front sectional view of a push switch of the track ball device according to embodiment 6.
Figure 36:
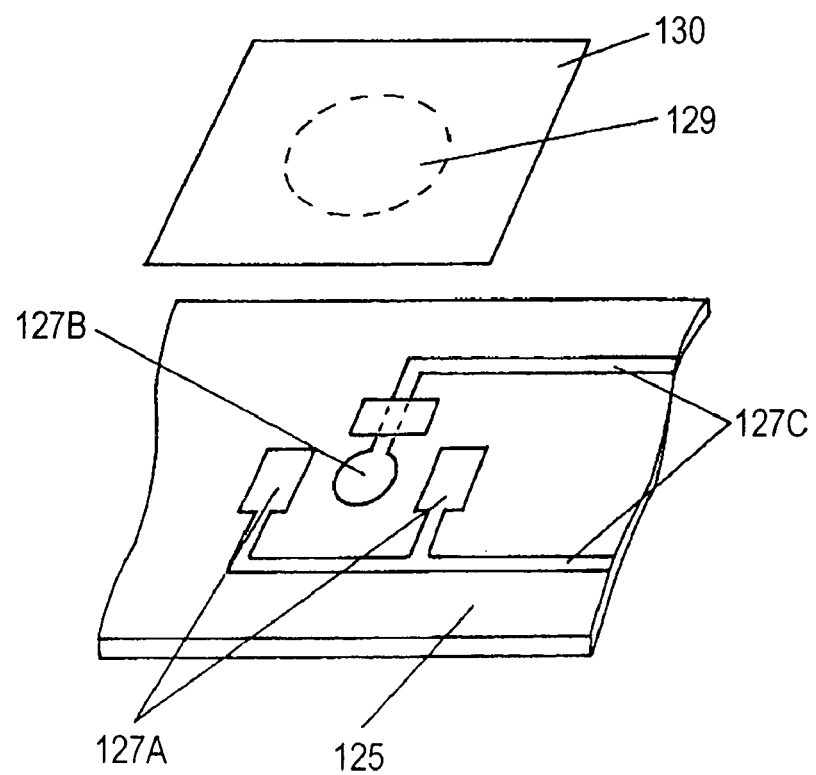
FIG. 36 is a perspective view of a disassembled push switch in FIG. 35.

The self-resetting push switch 127 includes, as shown in a front sectional view in FIG. 35 and a perspective view in FIG. 36, a switch fixed contact 127A made of a metal foil formed at a specified position on the circuit board 125, a dome-shaped movable contact 129 made of a thin elastic metal plate mounted thereon, and a flexible insulating film 130 having an adhesive layer at a lower side thereof, for covering a fixed contact 127B and a contact point 127B facing to each other with an interval. The switch 127 is a self-resetting push switch having a high performance, small height, and being inexpensive for generating a click feel at the time of motion.

The dome-shaped movable contact 129 has an elastic repulsive force set at a specified value enough to prevent the dome shape from being inverted as being pushed by the protrusion 128B at the lower end of the case 128 in the ordinary operation or during a manipulation of the ball 108.

The self-resetting push switch 127 may not be required to be formed on the circuit board 125, and may be a single switch mounted on the circuit board 125 with using a push switch having a small height. The protrusion 128B contacting with the upper center of the push switch 127 may not be provided on the case 128, but may be provided on the base unit 126.

An operation of the track ball device according to the embodiment having such configuration will be explained below.

The ball 108, an operating element, upon having the upper portion thereof rotated, moves a position of a cursor on a display screen of an electronic apparatus employing the track ball device similarly to embodiment 5, and the explanation is omitted.

Then, when the cursor on the display screen is located to a desired position, the top of the ball 108 is pushed down by a hand or finger from an ordinary position shown in FIG. 33 and FIG. 34. Then the base unit 126 supporting the ball 108 through the rollers 102 to 105 rotates about the rotary support shaft 126A. Thus, the upper center of the push switch 127 on the circuit board 125, i.e., the dome-shaped movable contact 129 is pushed down by the protrusion 128B at the lower end of the case 128 fixed to the base unit 126 through the insulating film 130.

Figure 37:
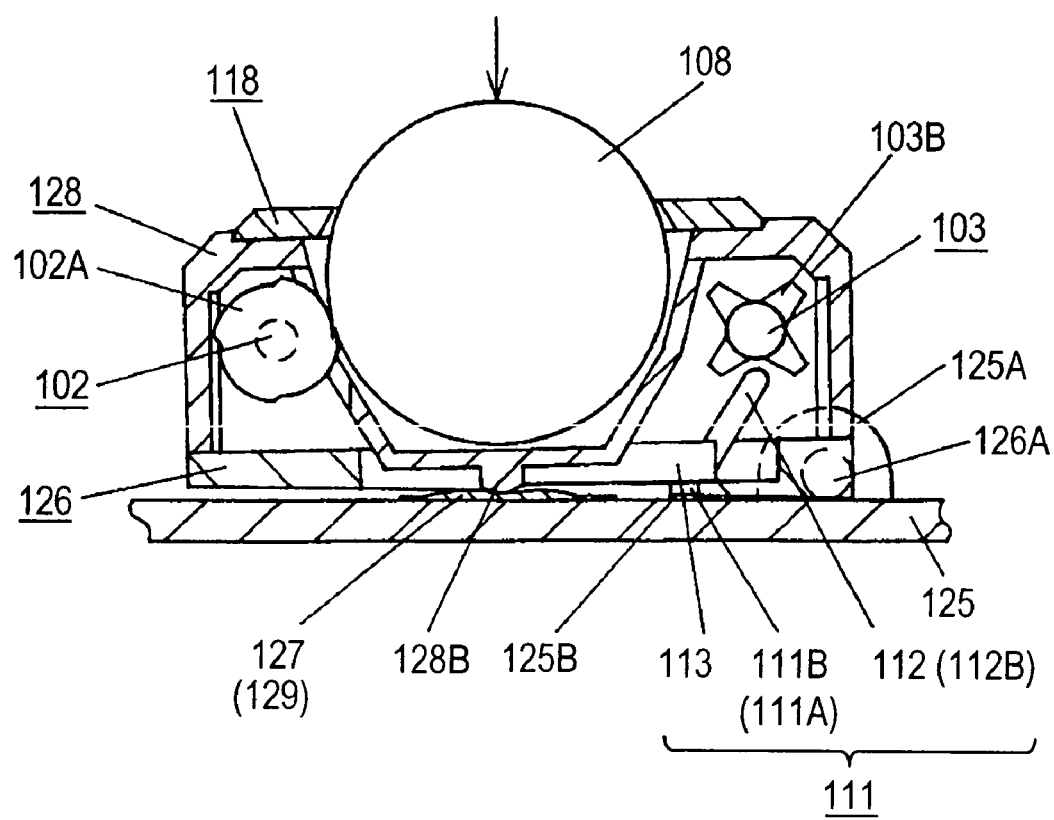
FIG. 37 is a sectional view of the track ball device having a ball pushed according to embodiment 6.

When this pushing force exceeds a specified value, the dome-shaped movable contact 129 is elastically inverted with a click feel, and the lower side of the movable contact 129 contacts with the center of the fixed contact 127B as shown in a sectional view in FIG. 37. As a result, the switch fixed contact 127A and center fixed contact 127B conduct to each other through the dome-shaped movable contact 129.

The conducting is transmitted to a circuit of the electronic apparatus through the wiring 127C on the circuit board 125, as for example, a signal indicating that a position of the cursor on the display screen is recognized.

When the pushing force applied on the top of the ball 108 is removed, the dome-shaped movable contact 129 of the push switch 127 returns to the original dome shape by the own elastic restoring force, and rotates the base unit 126 in a direction for pushing back the base unit 126 upward through the protrusion 128B, i.e., the case 128. Thereby the device returns to the original ordinary state shown in FIG. 33 and FIG. 34. As a result, the switch fixed contact 127A and the center fixed contact 127B of the push switch 127 open again.

When the ball 108 is pushed down and manipulated, the rollers 102 to 105 do not rotate because the ball 108 contacts with the recess of the contacting portions 102A to 105A, and the four switches 111 for detecting the rotating amount do not operate.

Thus, the track ball device with the push switch according to embodiment 6 generates a click feel when having the ball 108 manipulated. And the device can move the cursor on the display screen precisely, and generate a recognition signal of a position of the cursor through having the ball 108 pushed down. Further the device has a small projection area, and operates stably.

In the explanation herein, the circuit board 125 has connection points 125B elastically connected to the elastic output terminals 111A, 111B mounted to the base unit 126. Instead of the points 125B, a flexible connection board (not shown) disposed at the lower side of the base unit 126 may be connected to the circuit board 125. Thus, the output terminals 111A, 111B are connected securely, and even if the base unit 126 moves against the circuit board 125, the flexible connection board follows to the base unit to keep the connection.

Embodiment 7

Figure 38:
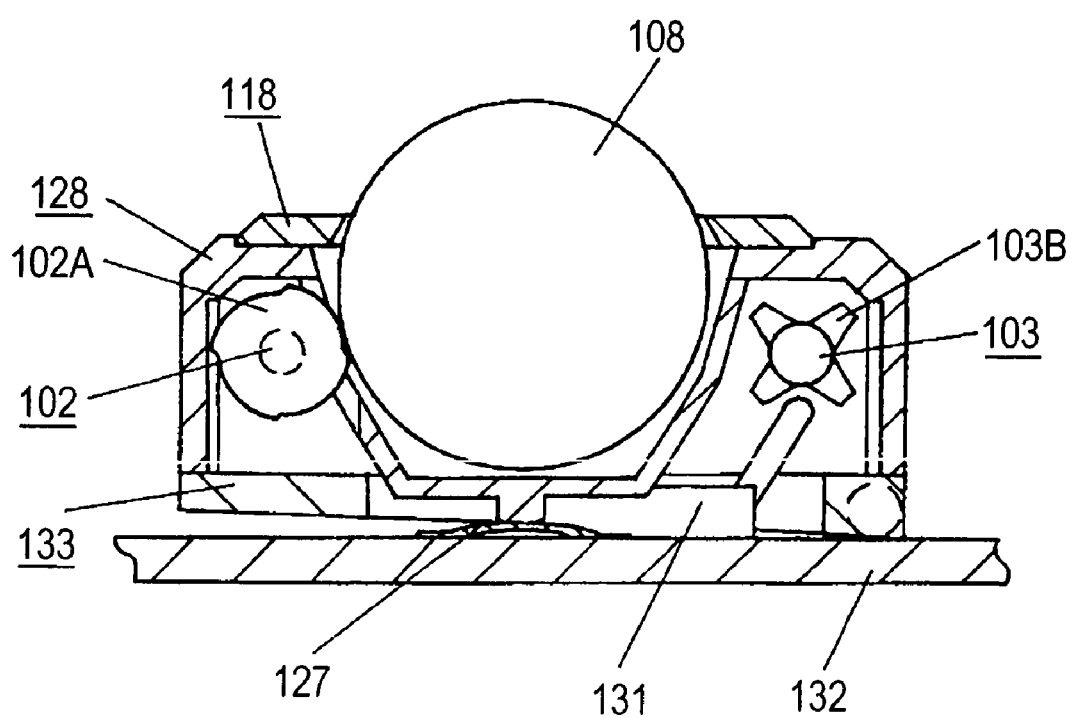
FIG. 38 is a sectional view of a track ball device having a case excluded according to embodiment 7 of the invention.

FIG. 38 is a sectional view of a track ball device according to embodiment 7 of the invention. This track ball device is similar to embodiment 6 shown in FIG. 34, except that the member for mounting four switches 131 rotation amount detecting units.

That is, as shown in FIG. 38, the four switches 131 are mounted and connected on a circuit board 132 of an electronic apparatus employing this track ball device so as to surround a push switch 127. The positions correspond to cams 102B to 105B of rollers 102 to 105 mounted on a base unit 133 rotatably held to the circuit board 132.

A top view of the push switch 127 and four switches 131 is the same as in embodiment 6 shown in FIG. 31, and detailed description is omitted.

An operation of the track ball device according to embodiment 7 is the same as in the embodiments 5 and 6, and description is omitted.

In this configuration, members requiring a wiring connection, i.e., the four switches 131 and push switch 127 can be preliminarily mounted on the circuit board 132 of the electronic apparatus employing the track ball device, and wiring is not needed at the base unit 133 holding the ball 108. Therefore, the track ball device with a push switch assembled easily and mounted easily on the electronic apparatus is provided.

Embodiment 8

Figure 39:
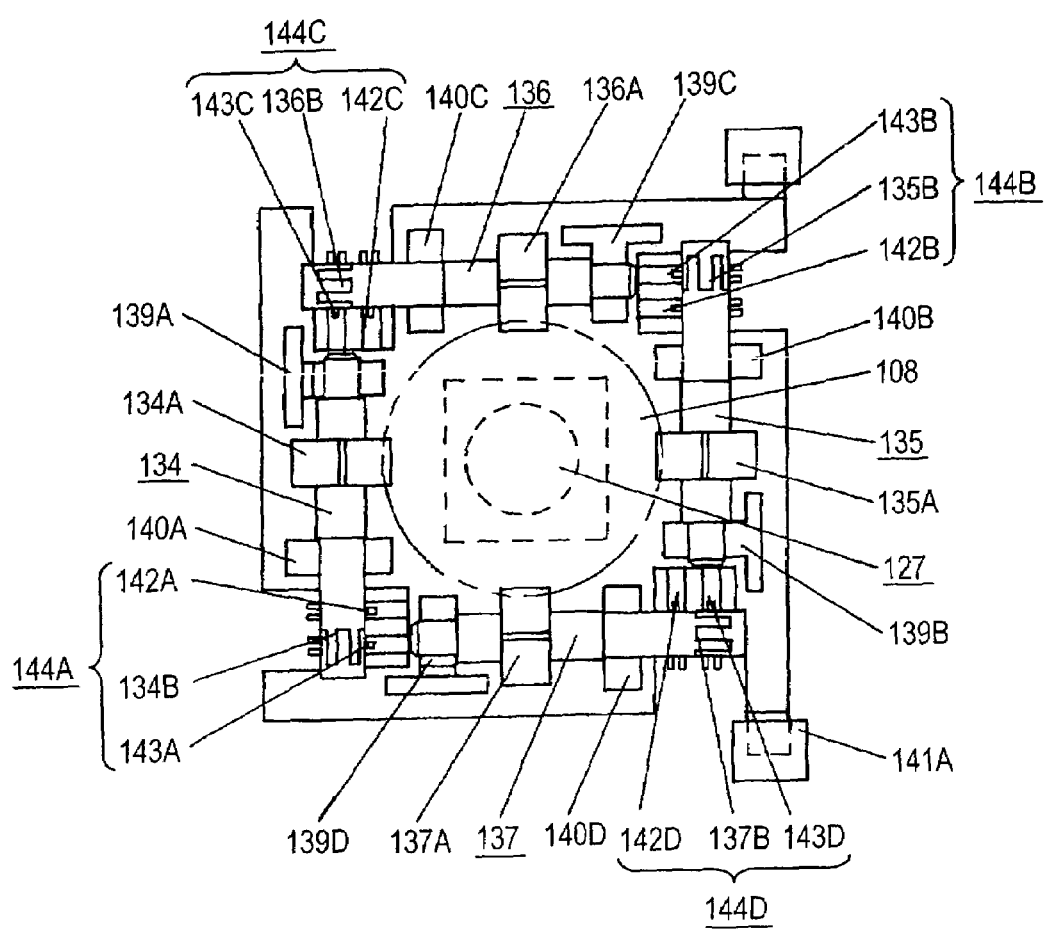
FIG. 39 is a plan view of a track ball device having a case excluded according to embodiment 8 of the invention.
Figure 40:
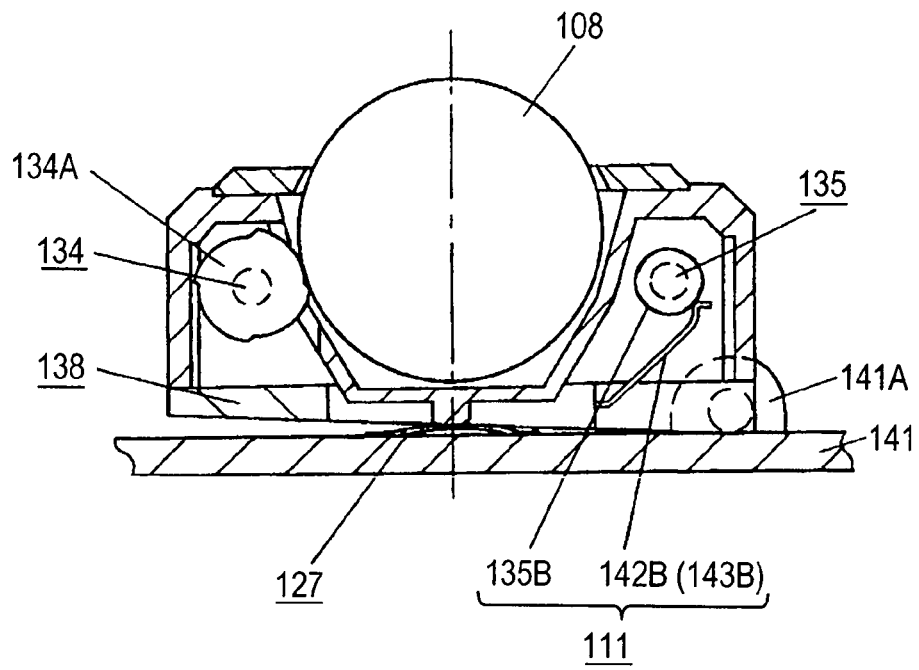
FIG. 40 is a sectional view at a cut line similar to the line U-T-V in FIG. 32 of the track ball device according to embodiment 8.

FIG. 39 is a plan view of a track ball device having a case excluded according to embodiment 9 of the invention, and FIG. 40 is a sectional view at a cut-off line, similar to the line U-T-V in FIG. 32 shown in embodiment 6. The track ball device according to embodiment 8 is similar to embodiments 5 to 7 except configurations of switches for detecting a rotation amount of cylindrical rollers 134 to 137 for supporting the ball 108 rotatably in all directions.

That is, the rollers 134 to 137 rotatably supported by support units 139A to 139D and support units 140A to 140D formed on a base unit 138 have rotary movable contacts 134B to 137B on the outer circumference at one end, respectively. The rollers 134 to 137, similarly to those in embodiments 5 to 7, have contacting portions 134A to 137A of circular sawtooth section at the center.

A circuit board 141 of an electronic apparatus using the track ball device, similarly to that in embodiments 5 and 6, holds the base unit 138 rotatably with the holding portion 141A, and has a push switch 127 disposed at a position confronting the center of the base unit 138. This track ball device includes long arm-shaped elastic fixed contacts 142A to 142D and elastic fixed contacts 143A to 143D at positions corresponding to the rotary movable contacts 134B to 137B of the rollers 134 to 137, respectively. The contact points elastically contact with the rotary movable contacts 134B to 137B, and form rotary switches 144A to 144D, respectively.

Figure 41:
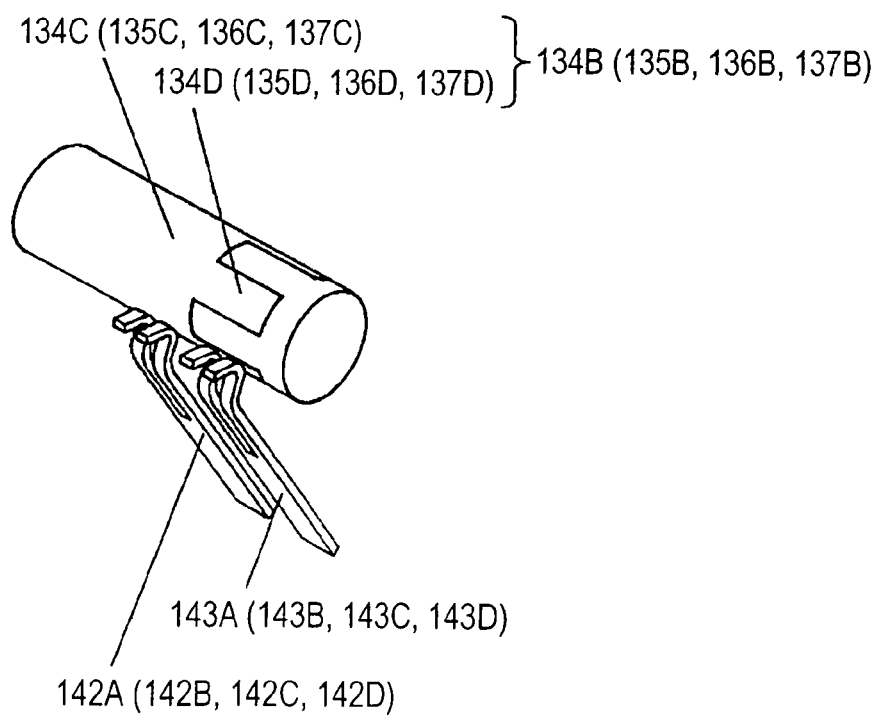
FIG. 41 is a perspective outline view of a rotary switch contact of the track ball device according to embodiment 8.

FIG. 41 is a perspective outline view of a contact point of a rotary switch. In the rotary switches 144A to 144D, rotary movable contacts 134B to 137B are composed of circular rings 134C to 137C and comb serrations 134D to 137D projecting therefrom. A pair of elastic fixed contacts 142A and 142B elastically contact with the circular ring 134C and comb serration 134D, respectively. Each pair of elastic fixed contacts 145A and 145B, elastic fixed contacts 146A and 146B, and elastic fixed contacts 147A and 147B elastically contact with the rotary movable contacts 135B to 137B, respectively. The rollers 134 to 137, upon being rotated, makes the elastic fixed contacts 142A to 142D, and 143A to 143D conduct or cut off each other.

The comb serrations 134D to 137D of the rotary movable contacts 134B to 137B are matched in the number and angular position with the undulations of the contacting portions 134A to 137A of the rollers 134 to 137, respectively.

The track ball device of embodiment 8, upon employing the rotary switches 144A to 144D having such configuration as the rotation amount detecting units, has a small rotation amount detecting units, and issues a turn on-off signal according to a rotation of the rollers 134 to 137 securely. Further, even when the base unit 138 rotates and pushes the push switch 127, the long arm-shaped elastic fixed contacts 142A to 142D, 143A to 143D follow to the base unit by deflecting, so that switch may not malfunction.

Embodiment 9

Figure 42:
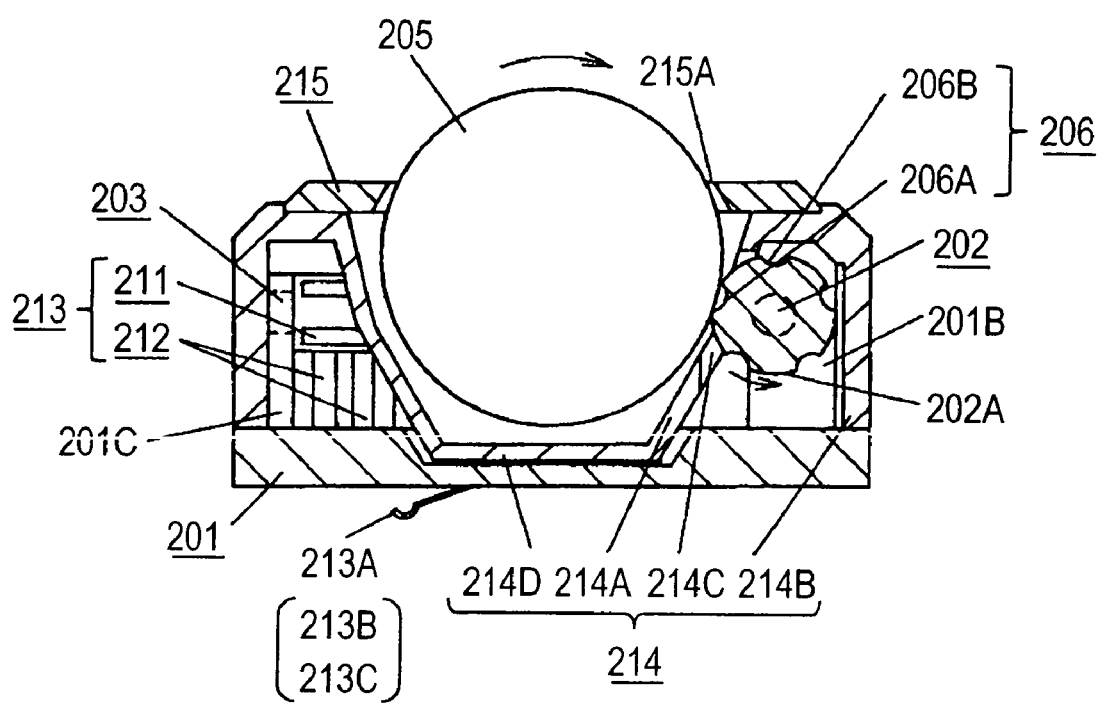
FIG. 42 is a front sectional view of a track ball device according to embodiment 9 of the invention.
Figure 43:
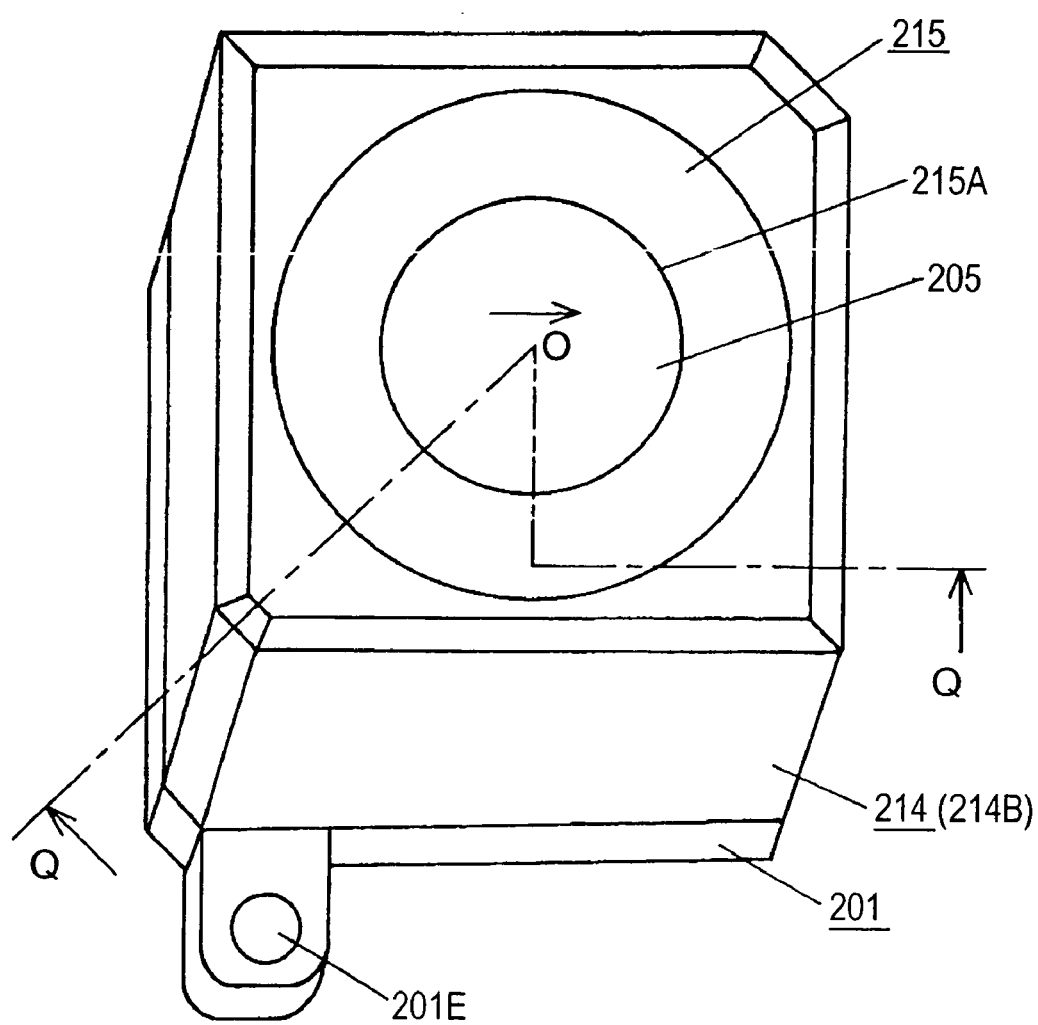
FIG. 43 is a perspective outline view of the track ball device in embodiment 9.
Figure 44:
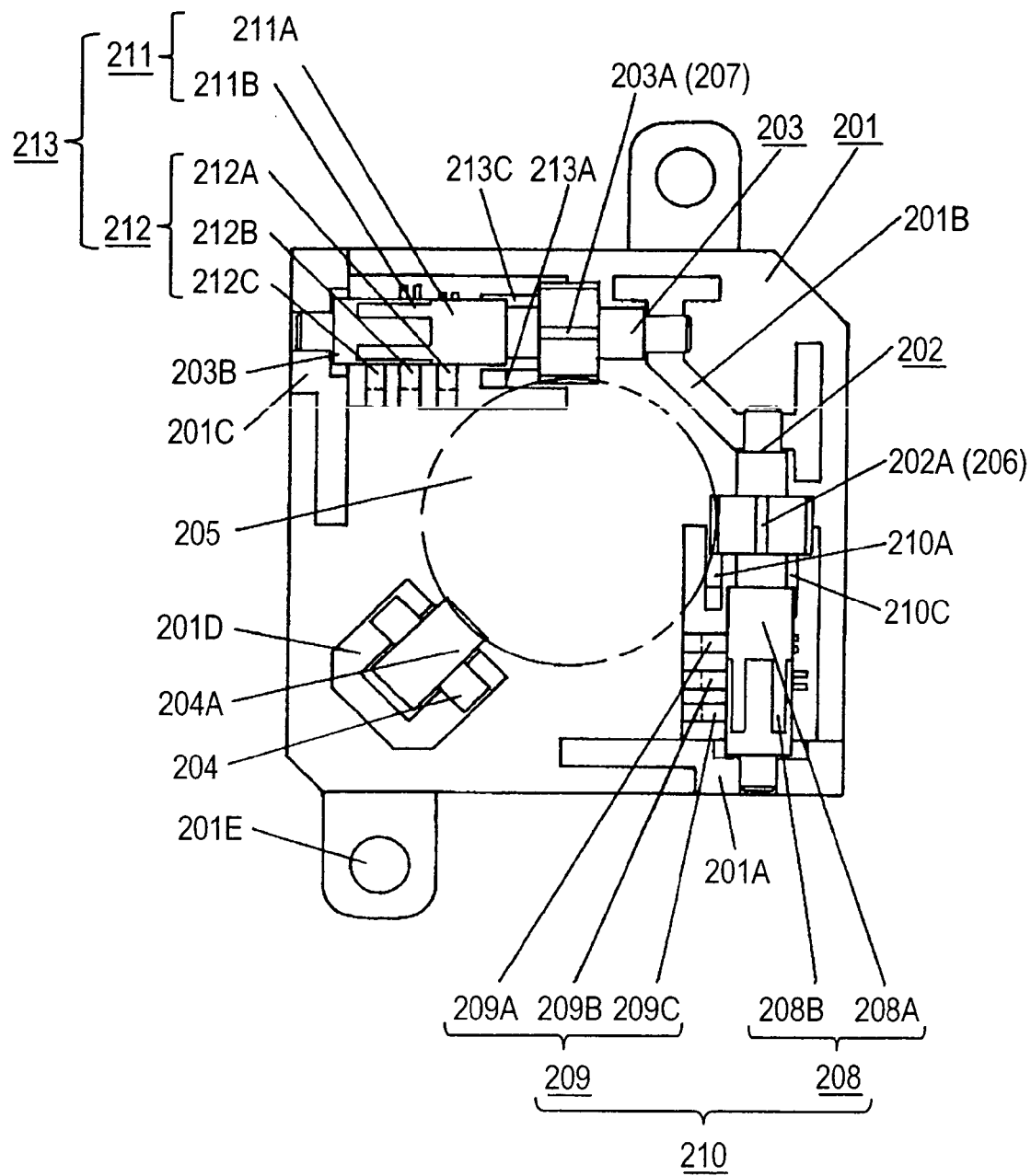
FIG. 44 is a plan view of the track ball device having a case excluded according to embodiment 9.
Figure 45:
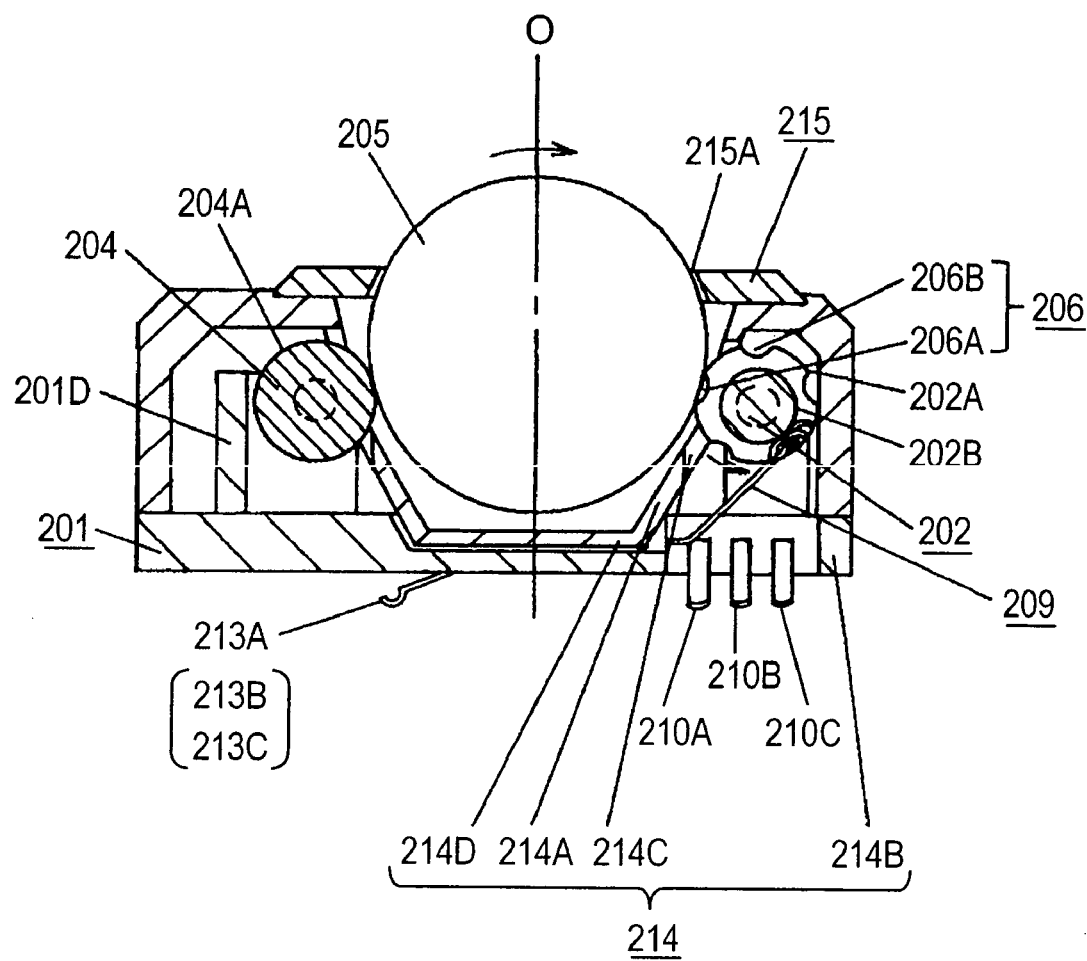
FIG. 45 is a sectional view at a line Q-O-Q of the track ball device in FIG. 43.

FIG. 42 is a front sectional view of a track ball device in embodiment 9 of the invention, FIG. 43 is a perspective outline view of the device, FIG. 44 is a plan view of the device having a case excluded, and FIG. 45 is a sectional view at a line Q-O-Q of the track ball device in FIG. 43.

A base unit 201 of the track ball device is made of resin in a square shape as seen from the top. On the top, as shown in FIG. 42 and FIG. 44, two cylindrical X roller 202 and Y roller 203 are disposed at right angle to each other in parallel to the sides near the two sides of the square. The rollers 202 and 203 are rotatably supported by support units 201A to 201C formed unitarily with the base unit 201.

Further, as shown in FIG. 44, at an intermediate position far from the X roller 202 and Y roller 203 on the top of the base unit 201, a third roller 204, a supporting member, is rotatably held by a support unit 201D.

The outer circumference located slightly lower than the center of the ball 205, an operating element, contacts with large-diameter contacting portions 202A, 203A, and 204A of the X roller 202, Y roller 203, and third roller 204. The contacting portions support the ball 205 rotatably in all directions.

Herein, the outer circumference of the large-diameter contacting portions 202A and 203A of the X roller 202 and Y roller 203 has a circumferential shape, as shown in FIG. 42, FIG. 44, and FIG. 45, having plural linear recesses 206 and 207 disposed on the circumferential surface at a specified angle pitch in parallel to the shaft of the roller. The large-diameter contacting portion 204A of the third roller 204 has a smooth circumferential surface.

In an ordinary state, the ball 205 stops as being trapped in one of the recesses 206 and 207 on the outer circumference of the large-diameter contacting portions 202A, 203A of the X roller 202 and Y roller 203.

A movable contact 208 composed of a circular ring 208A and a comb serration 208B is provided on the outer circumference of a medium-diameter shaft 202B which is a circular rotary shaft provided coaxially with the X roller 202. The comb serration 208B conducts with the circular ring 208A, and is formed at an angle pitch corresponding to the recess 206 of the large-diameter contacting portion 202A. Three elastic legs 209A to 209C having different length from each other of an elastic fixed contact 209 extending from the base unit 201 elastically contact with the movable contact 209, and form an X-rotary encoder 210 which is a rotation amount detecting unit of the X roller 202. Similarly to the X roller 202, a movable contact 211 composed of a circular ring 211A and a comb serration 211B is provided on the outer circumference of a circular medium-diameter shaft 203B provided coaxially with the Y roller 203. The comb serration 211B conducts with the circular ring 211A, and is formed at an angle pitch corresponding to the recess 207 of the large-diameter contacting portion 203A. Three elastic legs 212A to 212C having different lengths from each other of an elastic fixed contact 212 extending from the base unit 201 elastically contact with the movable contact 211, and form a Y-rotary encoder 213 which is a rotation amount detecting unit of the Y roller 203.

Electric signals generated by the encoders 210, 213 are transmitted to a circuit of an electronic apparatus employing the track ball device through elastic connection terminals 210A to 210C and elastic connection terminals 213A to 213C conducting with the elastic fixed contacts 209 and 212.

In the ordinary state, as mentioned above, the ball 205 stops as being trapped in the recesses 206 and 207 of the large-diameter contacting portions 202A and 203A. In this ordinary state, the encoders 210 and 213 do not generate electric signals. That is, the connection terminals 210A to 210C and 213A to 213C electrically open.

The encoders 210 and 213 are disposed on the outer circumference of the medium-diameter shafts 202B, 203B coaxially with the movable contact 208 and rollers 202, 203, and are hence small. Thus, the track ball device is formed in a compact size.

In the perspective outline view in FIG. 43, the top of the track ball deice is covered with a resin-made case 214 and lid plate 215.

Figure 46:
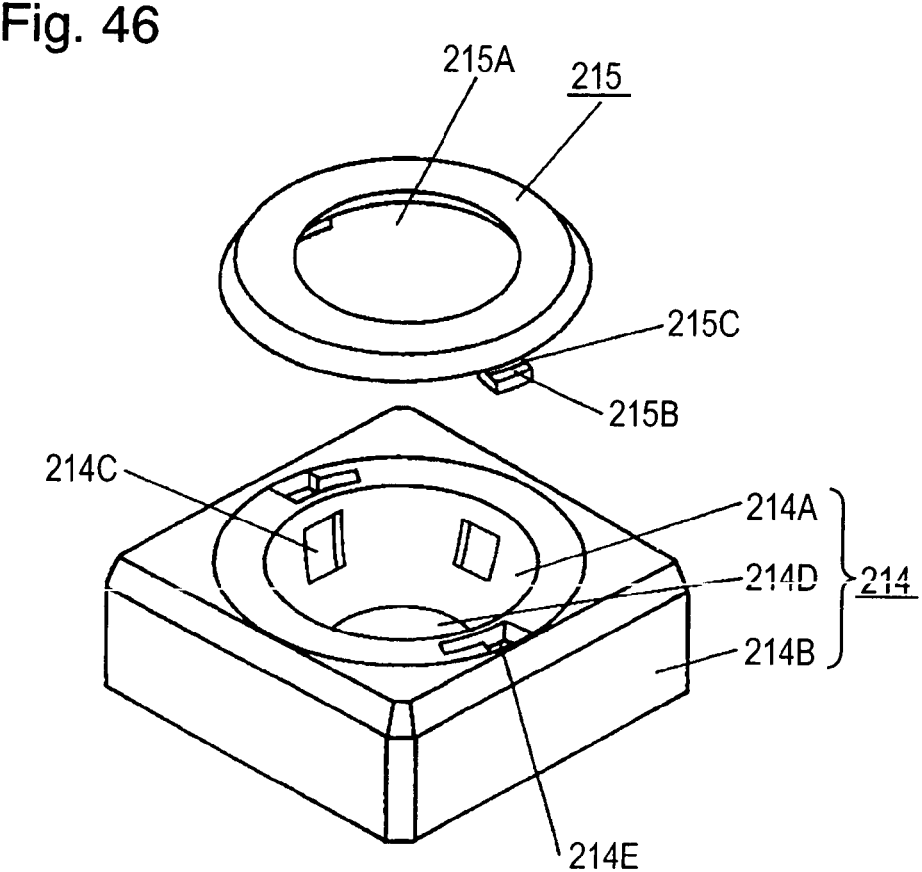
FIG. 46 is a perspective outline view of a coupling portion of a case and lid plate of the track ball device according to embodiment 9.

As shown in the perspective outline views in FIG. 42, FIG. 45, and FIG. 46, the case 214 opens at the upper end, and is composed of a bowl unit 214A for enveloping the lower portion of the ball 205, and a peripheral wall 214B extending downward from the outer circumference of the upper end surface to the lower end fixed to the base unit 201. The bowl unit 214A has through-holes 214C disposed at positions of the large-diameter contacting portion 202A of the X roller 202, large-diameter contacting portion 203A of the Y roller 203, and large-diameter contacting portion 204A of the third roller 204, contacting with the outer circumference of the ball 205. The center portion 214D is a dish located to face to the center portion of the base unit 201 with a slight clearance. Even if water splashes over this track ball device, the contact points of the X encoder 210 and Y encoder are not practically affected from the water.

The lid plate 215 is a ring having a circular hole 215A slightly smaller than the diameter of the ball 205 in the center. Two legs 215C having a step 215B are inserted into coupling holes 214E at the upper end of the case 214. Further, the lid plate 215, upon being rotated, is detachably coupled to the case 214. In the ordinary state, therefore, the ball 205 is prevented from being displaced from the track ball device. The lid plate 215, upon being removed, allows the ball 205 to be replaced.

For mounting the track ball device of embodiment 9 on an electronic apparatus, the track ball device needs to be just being pressed and fixed to the circuit board of the electronic apparatus with driving screws into mounting holes 201E provided at two positions at the side of the base unit 201. The connection terminals 210A to 210C and connection terminals 213A to 213C of the encoders 210 and 213 are elastically connected to the connection points (not shown), so that soldering or other connecting process is not needed.

Then, an operation of the track ball device of embodiment 9 will be explained.

In the ordinary state shown in FIG. 42, when the ball 205 is rotated as indicated by an arrow by touching the top of the ball 205 which is an operating element projecting upward from the circular hole 215A of the lid plate 215 of the track ball device by a hand or finger, the rotation is transmitted to the X roller 202 and third roller 204, but is not transmitted to the Y roller 203, out of the rollers 202 to 204 contacting with the large-diameter contacting portions 202A, 203A, and 204A on the outer circumference of the ball 205.

As the X roller 202 rotates in a direction shown in FIG. 42 and FIG. 45, the ball 205 has a contacting area fitting into the recess 206A on the outer circumference of the large-diameter contacting portion 202A escape from the recess 206A, move along the outer circumference, and fits into the next recess 206B, thus generating a click feel at the moment.

As the contacting area of the ball 205 moves from the recess 206A of the large-diameter contacting portion 202A of the X roller 202 to the recess 206B, the movable contact 208 of the X rotary type encoder 210 rotates. As a result, independent pulse signals are generated at the elastic legs 209A to 209C of the elastic fixed contact 209 elastically contacting with the circular ring 208A and comb serration 208B of the contact 208. That is, one pulse signal is generated each between connection terminals 210A and 210B, and between connection terminals 210A and 210C of the elastic legs 209A to 209C. In the X rotary type encoder 210, the relation between the generated pulse signal and the rotating direction of the movable contact 208, i.e., the X roller 202 is the same as a general rotary type encoder, and the explanation is omitted.

As the ball 205 continues to rotate and generates a click feel continuously between the ball 205 and the recess 206 on the outer circumference of the large-diameter contacting portion 202A, pulse signals are generated precisely by the number corresponding to the number of clicks between the connection terminals 210A and 210B, and between 210A and 210C. The signals are transmitted to the circuit of the electronic apparatus, and moves a cursor on a display screen in an X-direction precisely in response to the rotation amount.

When being rotated in a right direction, the ball 205 rotates on a contacting portion where the outer circumference of the ball 205 fits into the recess 207 on the outer circumference of the large-diameter contacting portion 203A of the Y roller 203, and thus, does not rotate the Y roller 203.

Similarly, when the ball 205 is rotated in the left direction, the X roller 202 rotates in a reverse direction of the above rotation while generating a click feel, and the X-rotary encoder 210 generates pulse signals of which number corresponds to the number of clicks.

When the ball 205 is rotated in an upper direction or lower direction, the Y roller 203 rotates and generates click feels. Between the connection terminals 213A, 213B, and between the connection terminals 213A, 213C of the Y-rotary encoder 213, pulse signals of which number corresponds to the number of clicks are generated. And the cursor on the display screen of the electronic apparatus moves in the Y-direction precisely.

When the ball 205 is rotated in an oblique direction, the X roller 202 and Y roller 203 rotate while generating a click feel at a rate corresponding to an inclination of the manipulating direction, and generate pulse signals are of which number corresponds to the number of clicks in the connection terminals 210A to 210C and connection terminals 213A to 213C of the X encoder 210 and Y encoder 213. As a result, the cursor on the display screen of the electronic apparatus moves precisely in a direction corresponding to an inclination of a rotating direction of the ball 205 in response to the rotation amount of the ball 205.

When the ball 205 is rotated, the third roller 204 rotates together with the X roller 202 and Y roller 203, thereby supporting the ball 205 which thus can rotate smoothly.

The third roller 204 is required only to have a function of supporting the ball 205 rotatably together with the X roller 202 and Y roller 203. Therefore, this roller may not be required to have a rotary shaft, and a spherical slippery support member may be used.

Further, in this track ball device, the outer circumference of the large-diameter contacting portions 202A and 203A of the X roller 202 and Y roller 203 have a circumferential shape having undulations. Therefore, according to the necessity of manipulation in the electronic apparatus using the track ball device, undulations may be formed on the outer circumference of either the X roller 202 or Y roller 203 to generate the click feel only when the specific roller rotates in order that the device can be manipulated precisely.

In the above explanation, the outer circumference of the large-diameter contacting portions 202A, 203A of the X roller 202 and Y roller 203 has undulations having plural linear recesses 206, 207 on the outer circumference. The outer circumference of such shape can be easily formed by cutting process on the circumferential surface, and the number of recesses 206 and 207 can be easily changed according to requirement.

Figure 47:
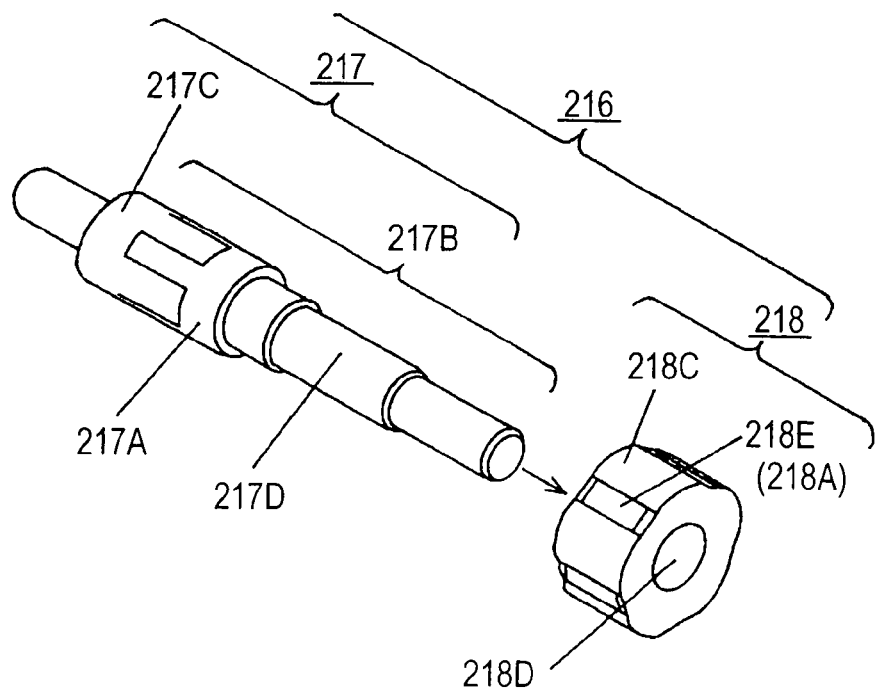
FIG. 47 is a perspective outline view for explaining another method of manufacturing a rotary roller of the track ball device according to embodiment 9.
Figure 48:
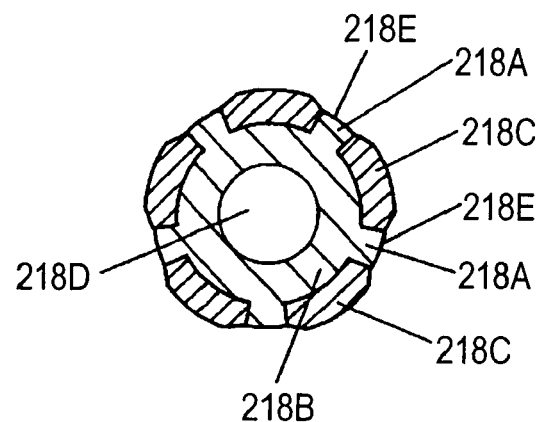
FIG. 48 is a sectional view of an annular contacting area of the rotary roller manufactured by another method of the track ball device according to embodiment 9.

FIG. 47 is a perspective outline view showing another method of manufacturing the rotary roller of the track ball device according to embodiment 9 of the invention. FIG. 48 is a sectional view of an annular contacting portion of the rotary roller manufactured by the method.

As shown in FIG. 47, a rotary roller 216 is manufactured as being separated into a rotary shaft 217 and an annular contacting portion 218. A metal shaft 217B integrally having a movable contact 217A is outsert-formed with insulating resin to form an insulating portion 217C, and the rotary shaft 217 is thus manufactured. The annular contacting portion 218 has a structure as shown in FIG. 48. An annular element 218B is made of rigid material such as metal and has plural protrusions 218A projecting radially at a specified angle interval on the outer circumference. By filling gaps between protrusions 218A of the annular element 218B with an elastic resin by insert forming, a bump 218C extending in an axial direction with a semicircular section projects to the outer circumference. By pressing and coupling a center hole 218D of the annular contacting portion 218 to an intermediate step 217D of the rotary shaft 217, the rotary roller 216 is completed.

The width of a leading end 218E of each protrusion 218A of the annular element 218B made of rigid material is set so as to form a necessary angle interval for allowing the ball 205, i.e., the operating element to contact with the leading end.

Figure 49:
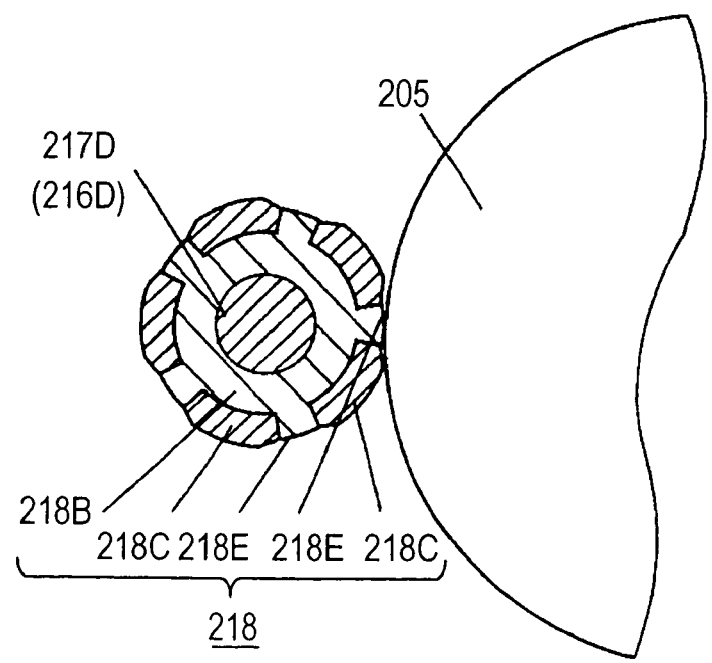
FIG. 49 is an enlarged sectional view of a contacting portion of a rotary roller and ball manufactured by another method of the track ball device according to embodiment 9.
Figure 50:
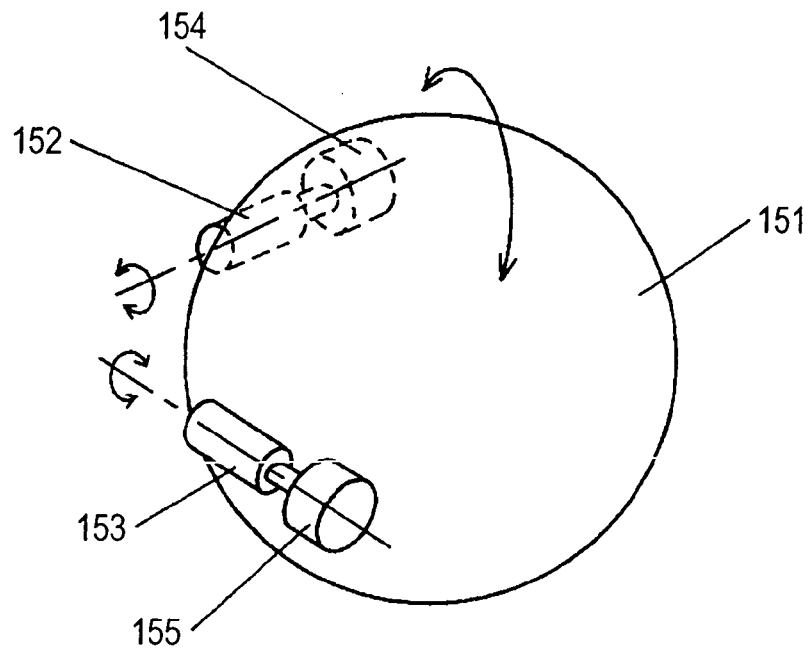
FIG. 50 is a perspective view showing a configuration of a conventional track ball device.
Figure 51:
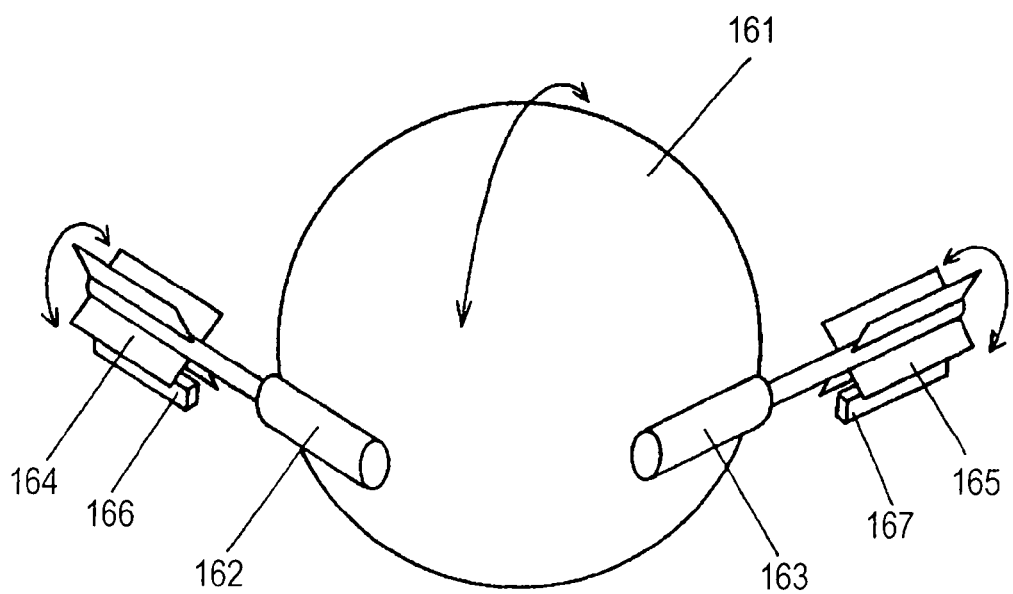
FIG. 51 is a perspective view showing another configuration of a conventional track ball device.

FIG. 49 is an enlarged sectional view of the contacting portion of the rotary roller and the ball. The annular contacting portion 218 of the rotary roller 216 thus formed has a recess 218E made of rigid material, and a bump 218C made of elastic material disposed alternately at a specified angle interval to form undulations on the outer circumference. Therefore, as shown in FIG. 49, the rotation of the ball 205 is transmitted securely to the rotary roller 216 without a slip by a large frictional force between the bump 218C made of elastic material of the rotary roller 216 and the ball 205. When the rotation of the ball 205 is not transmitted to the rotary roller 216, the ball 205 slips with a slight frictional force in the recess 218E made of rigid material. Therefore, the track ball device operating stably by smooth manipulation is obtained.

Further, the entire surface of the ball 205 may be coated with a film made of elastic material. As a result, the frictional force between the ball 205 and the contacting portions of the rollers 202, 203 can increase, and slip hardly in this contacting area, so that the track ball device operating stably is obtained.

Further, fine undulations smaller than the width of the recesses 206, 207 may be formed on the entire surface of the ball 205. As a result, at the contacting portion of the ball 205 and rollers 202, 203, when the ball 205 is rotated, the bump of the undulations on the surface of the ball 205 is hooked on the recesses 206, 207 on the outer circumference of the large-diameter portions 202A, 203A. Thus, the track ball device generating a click feel and being manipulated precisely is provided, and the slip hardly occurs in this contacting area, so that the track ball device operating stably is obtained.

Thus, according to embodiment 9, without having an increasing number of constituent members, the track ball device easy to be manipulated precisely while generating a click feel when the ball 205 is rotated is provided. Further, the generated click feel does not change a rotary torque transmitted in the contacting portion of the ball 205 and rollers 202, 203, and the track ball device having the ball hardly slipping in the contacting area is provided.

The track ball device shown in embodiments 1 to 7, upon being used in the electronic apparatus having a display unit, provides a mechanism for generating a signal indicating that a position of a cursor on the display unit shown in embodiment 6.

INDUSTRIAL APPLICABILITY

The invention relates to a track ball device for manipulating a cursor moving on a display screen of an electronic apparatus, and to an electronic apparatus using the device. According to the invention, a track ball device which generates a clear click feel when a ball is rotated, and which is capable of manipulating the move of the cursor on the display screen of the electronic apparatus precisely without generating a jerky feel in the manipulation is provided, and an electronic apparatus using the device is also provided.

The invention claimed is:

1. A track ball device comprising:
   a ball;
   four rollers having a circular shaft shape disposed in a square, two sets of two opposite rollers of said rollers being disposed in orthogonal to each other, said rollers being rotated with said ball while contacting with a outer circumference below a center of said ball;
   rotating direction regulating units for allowing said two opposite rollers of said rollers to rotate only in opposite directions, respectively;
   rotation amount detecting units for detecting a rotation amount of said rollers;
   support units for supporting said rollers; and
   a base unit having said support unit disposed thereon.

2. The track ball device of claim 1, wherein said rotating direction regulating units includes:
   ratchet gears each having sawtooth serrations disposed at equiangular positions on an circular outer circumference thereof, said rachet gears being disposed at sides of contacting portions of said rollers, respectvely, the ball contacting with said rollers at said contacting portions; and
   arresting ratchets elastically contacting with said sawtooth serrations, said sawtooth serrations of said ratchet gears provided on said opposite rollers being inclined in mutually opposite directions.

3. The track ball device of claim 2, wherein a number of said sawtooth serrations of said ratchet gears is synchronized with a number of outputs of said rotation amount detecting units in one rotation of said rollers.

4. The track ball device of claim 1, wherein said rotating direction regulating units includes:
   pins projecting radially at an equiangular interval from each of said rollers radially about a center of a rotation of each of said rollers; and
   arresting ratchets repeating elastically displacing and restoring as being pushed with said pins when said rollers rotate in a specified direction, said arresting rachets preventing said roller for rotating in a reverse direction against the specific direction by contacting with said pins.

5. The track ball device of claim 4, wherein a number of said pins projecting from each of said rollers is synchronized with a number of outputs of each of said rotation amount detecting unit in one rotation of each of said rollers.

6. The track ball device of claim 4, wherein said rotation amount detecting units include switches driven through said arresting ratchets, respectively.

7. The track ball device of claim 1, wherein said rotation amount detecting units include:
   movable contact provided on outer circumferences of said rollers, respectively; and
   rotary switches supported on said base unit, said rotary switches having elastic fixed contacts elastically contacting with said movable contacts, respectively.

8. The track ball device of claim 1, wherein said rollers contact with said ball on the same plane.

9. The track ball device of claim 1,
   wherein said support units include elastic members for pushing said rollers for narrowing an interval between said opposite rollers, and
   wherein the interval is increased with an own weight of said ball and a pressure during a manipulation of said ball.

10. The track ball device of claim 1, wherein said ball includes a film made of elastic material covering an entire surface thereof.

11. The track ball device of claim 1, wherein recesses are formed on an entire surface of said ball.

12. The track ball device of claim 1, further comprising:
    a case including:
       a bowl unit having an opening formed at an upper end thereof, said bowl unit having through-holes formed at positions where said rollers contact with said ball; and
       a peripheral wall extending from an outer circumference of an upper end of said bowl unit, said peripheral wall being fixed to said base unit; and
    a lid plate detachably disposed at said opening of said case, said lid plate having a ring-shape, said lid plate having a center circular hole smaller than a diameter of said ball,
    wherein said ball is surrounded by said case and lid plate.

13. The track ball device of claim 1, further comprising elastic output terminals of said rotation amount detecting units projecting extending from an opposite side to said support units about said base unit.

14. The track ball device of claim 1,
    wherein each of said rollers includes sawtooth serrations having a specified number of undulations having a specified step, said circular sawtooth serrations being formed at an equal interval of a section at a portion where said ball contacts, directions of said sawtooth serrations of said two opposite rollers are opposite to each other, and
    wherein each of said rotating direction regulating units are formed at said portion where said ball contacts.

15. The track ball device of claim 14, wherein a number of said sawtooth serrations formed on each of said rollers is synchronized with a number of an output of each of said rotation amount detecting units.

16. The track ball device of claim 14,
    wherein said support unit includes an elastic member for pushing said rollers in a direction for narrowing an interval between said opposite rollers, and
    wherein the interval is increased by an own weight of said ball and a pressure during a manipulation of said ball.

17. The track ball device of claim 14, wherein a sectional shape of said sawtooth serrations is formed by overlaying a specified number of arcs by deviating a reference circle by the specified step in a radial direction of each of said rollers having said undulations, and said arcs are cut off in the radial direction.

18. The track ball device of claim 14, wherein said ball includes a film made of elastic material for covering an entire surface thereof.

19. The track ball device of claim 14, wherein recesses are formed on said entire surface of said ball.

20. The track ball device of claim 14, further comprising:
    a case including:
       a bowl unit having an opening at an upper end thereof, said bowl unit having through-holes formed at positions where said rollers contact with said ball; and
       a peripheral wall extending from an outer circumference of an upper end of said bowl unit, said peripheral wall being fixed to said base unit; and
    a lid plate detachably disposed at said opening of said case, said lid plate having a ring-shape, said lid plate having a center hole smaller than a diameter of said ball, being detachably disposed in the opening of the upper end of the case unit, wherein said ball is surrounded by said case and lid plate.

21. The track ball device of claim 14,
wherein each of said rollers includes a cam, and
wherein each of said rotation amount detecting units includes a switch driven by said cam.

22. The track ball device of claim 14,
wherein each of said rollers includes a movable contact on an outer circumference thereof, and
wherein each of said rotation amount detecting units includes an elastic fixed contact elastically contacting with said movable contact.

23. The track ball device of claim 14, further comprising elastic output terminals of said rotation amount detecting units projecting from an opposite side of said support units disposed on said base unit.

24. The track ball device of claim 14, further comprising:
a circuit board for rotatably supporting said base unit; and
a self-resetting push switch disposed on said circuit board said self-resetting push switch being pushed to operate when said base unit rotates.

25. The track ball device of claim 24, wherein said rotation amount detecting units are disposed at said circuit board.

26. The track ball device of claim 24, wherein said rotation amount detecting units are disposed at said base unit.

27. The track ball device of claim 26, further comprising elastic output terminals of said rotation amount detecting units projecting from an opposite side to said support units disposed on said base unit, wherein said elastic output terminals are elastically coupled with said circuit board.

28. The track ball device of claim 26, further comprising a flexible connection board for connecting said elastic output terminals to said circuit board.

29. An electronic apparatus comprising:
a track ball device comprising:
a ball;
four rollers having a circular shaft shape disposed in a square, two sets of two opposite rollers of said rollers being disposed in orthogonal to each other, said rollers being rotated with said ball while contacting with a outer circumference below a center of said ball;
rotating direction regulating units for allowing said two opposite rollers of said rollers to rotate only in opposite directions, respectively;
rotation amount detecting units for detecting a rotation amount of said rollers;
support units for supporting said rollers;
a base unit having said support unit disposed thereon; and
elastic output terminals of said rotation amount detecting units projecting extending from an opposite side to said support units about said base unit; and
a circuit board with which said elastic output terminals elastically contact.

30. An electronic apparatus comprising:
a track ball device comprising:
a ball;
four rollers having a circular shaft shape disposed in a square, two sets of two opposite rollers of said rollers being disposed in orthogonal to each other, said rollers being rotated with said ball while contacting with a outer circumference below a center of said ball;
rotating direction regulating units for allowing said two opposite rollers of said rollers to rotate only in opposite directions, respectively;
rotation amount detecting units for detecting a rotation amount of said rollers;
support units for supporting said rollers; and
a base unit having said support unit disposed thereon; and
display means for displaying information, wherein the information can be selected with an output signal of at least one of said rotation amount detecting units by rotating said ball.

31. An electronic apparatus comprising:
a track ball device comprising:
a ball;
four rollers having a circular shaft shape disposed in a square, two sets of two opposite rollers of said rollers being disposed in orthogonal to each other, said rollers being rotated with said ball while contacting with a outer circumference below a center of said ball, each of said rollers including sawtooth serrations having a specified number of undulations having a specified step, said circular sawtooth serrations being formed at an equal interval of a section at a portion where said ball contacts, directions of said sawtooth serrations of said two opposite rollers are opposite to each other;
rotating direction regulating units for allowing said two opposite rollers of said rollers to rotate only in opposite directions, respectively, each of said rotating direction regulating units being formed at said portion where said ball contacts;
rotation amount detecting units for detecting a rotation amount of said rollers;
support units for supporting said rollers; and
a base unit having said support unit disposed thereon;
a circuit board rotatably supporting said base unit; and
a self-resetting push switch disposed on said circuit board, said self-resetting push switch being pushed to operate when said base unit rotates.

32. The electronic apparatus of claim 31, wherein said rotation amount detecting units are disposed at said circuit board.

33. The electronic apparatus of claim 31, wherein said rotation amount detecting units are disposed at said base unit.

34. The electronic apparatus of claim 33,
wherein said track ball device further comprises an elastic output terminals of said rotation amount detecting units projecting from an opposite side to said support units disposed on said base unit, and
wherein said elastic output terminals elastically contact to said circuit board.

35. The electronic apparatus of claim 33, further comprising a flexible connection board for connecting said elastic output terminals of said rotation amount detecting units to said circuit board.

36. An electronic apparatus comprising:
a track ball device comprising:
a ball;
four rollers having a circular shaft shape disposed in a square, two sets of two opposite rollers of said rollers being disposed in orthogonal to each other, said rollers being rotated with said ball while contacting with a outer circumference below a center of said ball, each of said rollers including sawtooth serrations having a specified number of undulations having a specified step, said circular sawtooth serrations being formed at an equal interval of a section at a portion where said ball contacts, directions of said sawtooth serrations of said two opposite rollers are opposite to each other;

rotating direction regulating units for allowing said two opposite rollers of said rollers to rotate only in opposite directions, respectively, each of said rotating direction regulating units being formed at said portion where said ball contacts;

rotation amount detecting units for detecting a rotation amount of said rollers;

support units for supporting said rollers; and a base unit having said support unit disposed thereon;

display means for displaying information; and an electronic circuit for controlling entirely said electronic apparatus, wherein the information displayed by said display means is selected by an output signal of at least one of said rotation amount detecting units by rotating said ball.

37. A track ball device comprising:

a ball;

X roller and Y roller of circular shaft shape having outer circumferences contacting with an outer circumference of said ball at contacting portions in directions orthogonal to each other, at least one of contacting portions having a plurality of recesses and bumps;

two rotation amount detecting units coupled to said X roller and Y roller, respectively;

a support unit contacting with said outer circumference of said ball at an intermediate position at a far side from said X roller and Y roller, said support unit supporting said ball rotatably in all directions; and a base unit for holding said X roller, Y roller and support unit.

38. The track ball device of claim 37, wherein said support unit imcludes a third roller rotatably held therewith, said third roller contacting with said outer circumference of said ball.

39. The track ball device of claim 37, wherein plural linear recesses are formed on at least one of said contacting portions said X roller and Y roller at a specified angle interval along a axial direction of said X roller and Y roller.

40. The track ball device of claim 37, wherein at least one of said contacting portions of said X roller and Y roller includes:

a substantially circular shaft made of rigid material; and a bump disposed on an outer circumference of said substantially circular shaft except a portion contacting with said ball, said bump having a long shape along an axis direction of said substantially circular shaft and a semicircular section, said bump being made of elastic material.

41. The track ball device of claim 37, wherein said ball includes a film made elastic material for covering an entire surface thereof.

42. The track ball device of claim 37, wherein small recesses having a smaller diameter than a width of said recesses are formed on said entire surface of said ball.

43. The track ball device of claim 37, wherein said rotation amount detecting units include:

movable contacts disposed on outer circumferences coaxial with said X roller and Y roller, respectively; and elastic fixed contacts held at said base unit, said elastic fixed contacts elastically contacting with said movable contacts, respectively.

44. The track ball device of claim 37, further comprising:

a case including:

a bowl unit having an opening at an upper end thereof, said bowl unit having through-holes formed at positions where said X roller, Y roller, and support unit contact with said ball; and a peripheral wall extending from an outer circumference of said opening, said peripheral wall being fixed to said base unit; and a ring unit detachably disposed at said opening of said case unit, said ring having a center circular hole smaller than a diameter of said ball, wherein said ball is surrounded by said case and ring unit.

45. The track ball device of claim 37, wherein said rotation amount detecting units include elastic connection terminals, respectively.

46. An electronic apparatus comprising:

a track ball device comprising:

a ball;

X roller and Y roller of circular shaft shape having outer circumferences contacting with an outer circumference of said ball at contacting portions in directions orthogonal to each other, at least one of contacting portions having a plurality of recesses and bumps;

two rotation amount detecting units coupled to said X roller and Y roller, respectively;

a support unit contacting with said outer circumference of said ball at an intermediate position at a far side from said X roller and Y roller, said support unit supporting said ball rotatably in all directions; and a base unit for holding said X roller, Y roller and support unit; and display means for displaying information, wherein the information displayed by said display means is selected by at least one output signal of said rotation amount detecting units by rotating said ball.

* * * * *

UNITED STATES PATENT AND TRADEMARK OFFICE
CERTIFICATE OF CORRECTION

| | | |
|---|---|---|
| PATENT NO. | : 7,158,119 B2 | Page 1 of 1 |
| APPLICATION NO. | : 11/057520 | |
| DATED | : January 2, 2007 | |
| INVENTOR(S) | : Shigeru Yokoji et al. | |

It is certified that error appears in the above-identified patent and that said Letters Patent is hereby corrected as shown below:

On the Title Page, Item -57- in the Abstract, line 10, delete "2 to 5;"
                                                            line 16, delete "3."

Col. 23, line 7, replace "a" with --an--.

Col. 23, line 19, replace "an" with --a--;
        line 21, replace "respectvely" with --respectively--.

Col. 23, line 41, replace "for" with --from--.

Col. 25, line 43, replace "a outer" with --an outer--.

Col. 25, line 66, replace "a outer" with --an outer--.

Col. 26, line 20, replace "a outer" with --an outer--.

Col. 26, line 65, replace "a outer" with --an outer--.

Col. 27, line 37, replace "imcludes" with --includes--.

Col. 27, line 42, after "portions" insert --of--;
        line 43, replace "a axial" with --an axial--.

Signed and Sealed this

Twenty-second Day of May, 2007

JON W. DUDAS
*Director of the United States Patent and Trademark Office*